United States Patent
Wolrich et al.

(10) Patent No.: US 10,503,510 B2
(45) Date of Patent: Dec. 10, 2019

(54) SM3 HASH FUNCTION MESSAGE EXPANSION PROCESSORS, METHODS, SYSTEMS, AND INSTRUCTIONS

(71) Applicant: Intel Corporation, Santa Clara, CA (US)

(72) Inventors: Gilbert M. Wolrich, Framingham, MA (US); Vinodh Gopal, Westborough, MA (US); Kirk S. Yap, Framingham, MA (US); Wajdi K. Feghali, Boston, MA (US); Sean Gulley, Santa Clara, CA (US)

(73) Assignee: Intel Corporation, Santa Clara, CA (US)

( * ) Notice: Subject to any disclaimer, the term of this patent is extended or adjusted under 35 U.S.C. 154(b) by 160 days.

(21) Appl. No.: 14/142,745

(22) Filed: Dec. 27, 2013

(65) Prior Publication Data

US 2015/0186139 A1   Jul. 2, 2015

(51) Int. Cl.
*G06F 15/00* (2006.01)
*G06F 9/30* (2018.01)
(Continued)

(52) U.S. Cl.
CPC ...... *G06F 9/30145* (2013.01); *G06F 9/30036* (2013.01); *G09C 1/00* (2013.01); *H04L 9/0643* (2013.01); *H04L 2209/122* (2013.01)

(58) Field of Classification Search
CPC ............ G06F 9/30036; G06F 9/30145; H04L 9/0643; H04L 2209/122; G09C 1/00
(Continued)

(56) References Cited

U.S. PATENT DOCUMENTS 4,250,483 A    2/1981  Rubner
5,339,398 A    8/1994  Shah et al.
(Continued)

FOREIGN PATENT DOCUMENTS

CN    1684412 A    10/2005
CN    103457719 A   12/2013
(Continued)

OTHER PUBLICATIONS

Gaoli Wang and Yanzhao Shen, Preimage and Pseudo-Collision Attacks on Step-Reduced SM3 Hash Function, Jun. 24, 2013.*
(Continued)

*Primary Examiner* — Chun Kuan Lee
(74) *Attorney, Agent, or Firm* — NDWE, LLP

(57) ABSTRACT

A processor includes a decode unit to receive an instruction to indicate a first source packed data operand and a second source packed data operand. The source operands each to include elements. The data elements to include information selected from messages and logical combinations of messages that is sufficient to evaluate:

$P1(W_{j-16}$ XOR $W_{j-9}$ XOR $(W_{j-3}<<<15))$ XOR$(W_{j-13}<<<7)$XOR $W_{j-6}$

P1 is a permutation function, $P1(X)=X$ XOR $(X<<<15)$ XOR $(X<<<23)$. $W_{j-16}$, $W_{j-9}$, $W_{j-3}$, $W_{j-13}$, and $W_{j-6}$ are messages associated with a compression function of an SM3 hash function. XOR is an exclusive OR operation. $<<<$ is a rotate operation. An execution unit coupled with the decode unit that is operable, in response to the instruction, to store a result packed data in a destination storage location. The result packed data to include a $W_j$ message to be input to a round j of the compression function.

25 Claims, 17 Drawing Sheets

(51) Int. Cl.
  *G09C 1/00* (2006.01)
  *H04L 9/06* (2006.01)
(58) Field of Classification Search
  USPC .......................................................... 712/208
  See application file for complete search history.

(56) References Cited

U.S. PATENT DOCUMENTS

| | | |
|---|---|---|
| 5,608,801 A | 3/1997 | Aiello et al. |
| 5,649,179 A | 7/1997 | Steenstra et al. |
| 5,920,900 A | 7/1999 | Poole et al. |
| 5,960,434 A | 9/1999 | Schimmel |
| 6,067,547 A | 5/2000 | Douceur |
| 6,189,086 B1 * | 2/2001 | Yamaura ............ G06F 9/30149 711/214 |
| RE37,178 E | 5/2001 | Kingdon |
| 6,226,710 B1 | 5/2001 | Melchior |
| 6,260,055 B1 | 7/2001 | Sugeno et al. |
| 6,307,955 B1 | 10/2001 | Zank et al. |
| 6,360,218 B1 | 3/2002 | Zander et al. |
| 6,470,329 B1 | 10/2002 | Livschitz |
| 6,539,373 B1 | 3/2003 | Guha |
| 6,578,131 B1 | 6/2003 | Larson et al. |
| 6,594,665 B1 | 7/2003 | Sowa et al. |
| 6,631,419 B1 | 10/2003 | Greene |
| 6,952,770 B1 | 10/2005 | Mittal et al. |
| 7,047,394 B1 | 5/2006 | Van Dyke et al. |
| 7,073,059 B2 | 7/2006 | Worely, Jr. et al. |
| 7,165,135 B1 | 1/2007 | Christie et al. |
| 7,240,203 B2 | 7/2007 | Kessler et al. |
| 7,373,514 B2 | 5/2008 | Krueger et al. |
| 7,599,489 B1 | 10/2009 | Spracklen |
| 7,684,563 B1 | 3/2010 | Olson et al. |
| 7,725,624 B2 | 5/2010 | Feghali et al. |
| 7,743,235 B2 | 6/2010 | Wolrich et al. |
| 8,020,142 B2 | 9/2011 | Wolrich et al. |
| 8,073,892 B2 | 12/2011 | Feghali et al. |
| 8,255,703 B2 | 8/2012 | Crispin et al. |
| 8,316,191 B2 | 11/2012 | Wheeler et al. |
| 8,504,802 B2 | 8/2013 | Valentine et al. |
| 8,634,550 B2 | 1/2014 | Gueron et al. |
| 9,317,719 B2 | 4/2016 | Gueron et al. |
| 9,658,854 B2 | 5/2017 | Wolrich et al. |
| 9,912,481 B2 | 3/2018 | Wolrich et al. |
| 2002/0032551 A1 | 3/2002 | Zakiya |
| 2002/0184498 A1 | 12/2002 | Qi |
| 2002/0191791 A1 | 12/2002 | Anand |
| 2003/0172252 A1 | 9/2003 | Henry et al. |
| 2003/0185391 A1 | 10/2003 | Qi et al. |
| 2004/0015579 A1 | 1/2004 | Cooper et al. |
| 2004/0042470 A1 | 3/2004 | Cooper et al. |
| 2005/0044134 A1 | 2/2005 | Krueger et al. |
| 2005/0089160 A1 | 4/2005 | Crispin et al. |
| 2006/0056620 A1 | 3/2006 | Shingal et al. |
| 2006/0136718 A1 | 6/2006 | Moreillon |
| 2009/0310775 A1 | 12/2009 | Gueron et al. |
| 2010/0214301 A1 | 8/2010 | Li et al. |
| 2010/0250965 A1 | 9/2010 | Olson et al. |
| 2010/0250966 A1 | 9/2010 | Olson et al. |
| 2011/0276790 A1 * | 11/2011 | Olson .................... G06F 7/728 712/222 |
| 2012/0257742 A1 | 10/2012 | Ebeid et al. |
| 2012/0328097 A1 | 12/2012 | Sheikh et al. |
| 2013/0010955 A1 | 1/2013 | Lu et al. |
| 2013/0132737 A1 | 5/2013 | Horsnell et al. |
| 2013/0283064 A1 | 10/2013 | Yap et al. |
| 2013/0332742 A1 | 12/2013 | Gueron et al. |
| 2013/0332743 A1 | 12/2013 | Gueron et al. |
| 2014/0019693 A1 | 1/2014 | Gulley et al. |
| 2014/0019694 A1 | 1/2014 | Gulley et al. |
| 2014/0093069 A1 | 4/2014 | Wolrich et al. |
| 2014/0095891 A1 | 4/2014 | Wolrich et al. |
| 2014/0185793 A1 | 7/2014 | Wolrich et al. |
| 2014/0189368 A1 | 7/2014 | Wolrich et al. |
| 2014/0195782 A1 | 7/2014 | Yap et al. |
| 2014/0331291 A1 | 11/2014 | Zou et al. |
| 2014/0362098 A1 | 12/2014 | Kerofsky |
| 2015/0043729 A1 | 2/2015 | Gopal et al. |
| 2015/0067302 A1 | 3/2015 | Gueron |
| 2015/0082002 A1 | 3/2015 | Parra et al. |
| 2015/0086019 A1 | 3/2015 | Tamminen et al. |
| 2015/0124970 A1 | 5/2015 | Li et al. |
| 2015/0178086 A1 | 6/2015 | Hughes et al. |
| 2015/0186138 A1 | 7/2015 | Wolrich et al. |
| 2015/0280917 A1 | 10/2015 | Wolrich et al. |
| 2016/0026468 A1 | 1/2016 | Gueron et al. |
| 2016/0070931 A1 | 3/2016 | Gueron et al. |
| 2016/0191252 A1 | 6/2016 | Li et al. |

FOREIGN PATENT DOCUMENTS

| | | |
|---|---|---|
| CN | 103477341 A | 12/2013 |
| CN | 103490895 A | 1/2014 |
| CN | 104012032 A | 8/2014 |
| EP | 0354774 A2 | 2/1990 |
| EP | 1596281 A2 | 11/2005 |
| EP | 2889760 A2 | 7/2015 |
| EP | 2890044 A2 | 7/2015 |
| GB | 1494750 A | 12/1977 |
| GB | 2496934 A | 5/2013 |
| JP | 2004-109420 A | 4/2004 |
| JP | 2012-252281 A | 12/2012 |
| TW | 200945198 A1 | 11/2009 |
| TW | 201332329 A1 | 8/2013 |
| WO | 2003/050784 A1 | 6/2003 |
| WO | 2003/090074 A2 | 10/2003 |
| WO | 2006/098015 A1 | 9/2006 |
| WO | 2013072657 A1 | 5/2013 |
| WO | 2013/095503 A1 | 6/2013 |
| WO | 2013/147877 A1 | 10/2013 |
| WO | 2014051751 A1 | 4/2014 |
| WO | 2014105135 A1 | 7/2014 |
| WO | 2015053945 A1 | 4/2015 |
| WO | 2016036491 A1 | 3/2016 |
| WO | 2017/030600 A1 | 2/2017 |

OTHER PUBLICATIONS

Extended European Search report received for European Patent Application No. 14194120.3, dated Jul. 10, 2015, 7 pages.
Shen, et al., "SM3 Hash function: draft-shen-sm3-bash-00", Internet Engineering Task Force, Internet-Draft, XP015078800, Oct. 24, 2011, 16 pages.
Non-Final Office Action received for U.S. Appl. No. 15/600,200, dated Jul. 3, 2017, 14 pages.
Intel, "Intel 64 and IA-32 Architectures Software Developer's Manual", vol. 1: Basic Architecture, Order No. 253665-040US, Oct. 2011, 548 pages.
Intel, "Intel 64 and IA-32 Architectures Software Developer's Manual", vol. 2 (2A, 2B & 2C): Instruction Set Reference, A-Z, Order No. 325383-040US, Oct. 2011, 1721 pages.
Intel, "Intel 64 and IA-32 Architectures Software Developer's Manual", vol. 3 (3A, 3B & 3C): System Programming Guide, Order No. 325384-040US, Oct. 2011, 1916 pages.
Intel, "Intel Advanced Vector Extensions Programming Reference", Jun. 2011, 595 pages.
Shen, et al., "SM3 Hash Function: draft-shen-sm3-hash-01", IETF Internet-Draft, Chinese Academy of Science, version 01, Feb. 14, 2014, 13 pages.
Notice of Allowance and Search Report received for Taiwan Patent Application No. 105144233, dated Sep. 29, 2017, 4 pages of Taiwan Notice of Allowance including 1 page of English Translation of Search Report.
Notice of Allowance received for U.S. Appl. No. 14/228,056, dated Oct. 19, 2017, 8 pages.
Non-Final Office Action received for U.S. Appl. No. 14/568,101, dated Oct. 6, 2017, 10 pages.
Office Action received for Chinese Patent Application No. 201510096246.8, dated Jul. 31, 2017, 10 pages of Chinese Office Action including 5 pages of English Translation.

(56) References Cited

OTHER PUBLICATIONS

Notice of Allowance received for Korean Patent Application No. 10-2015-0028373, dated Jan. 24, 2017, 2 pages of Korean Office Action Only.
Office Action received for Korean Patent Application No. 10-2015-0028373, dated Jul. 18, 2016, 5 pages of Korean Office Action including 2 pages of English Translation.
Notice of Allowance received for Taiwanese Patent Application No. 104105374, dated Nov. 28, 2016, 2 pages of Taiwanese Notice of Allowance Only.
Office Action and Search Report received for Taiwanese Patent Application No. 104105374, dated May 26, 2016, 18 pages of Taiwanese Office Action including 9 pages of English Translation.
Notice of Allowance received for Taiwan Patent Application No. 104127017, dated May 27, 2016, 4 pages (1 page of English Translation and 3 pages of Taiwanese Notice of Allowance).
Notice of Allowance received for U.S. Appl. No. 13/731,004, dated Sep. 2, 2014, 12 pages.
Final Office Action received for U.S. Appl. No. 14/228,056, dated Sep. 9, 2016, 11 pages.
Non-Final Office Action received for U.S. Appl. No. 14/228,056, dated Jan. 15, 2016, 11 pages.
Non-Final Office Action received for U.S. Appl. No. 14/228,056, dated Mar. 24, 2017, 8 pages.
Non Final Office Action received for U.S. Appl. No. 14/498,931, dated Apr. 8, 2016, 14 pages.
Notice of Allowance received for U.S. Appl. No. 14/498,931, dated Jan. 13, 2017, 7 pages.
Non-Final Office Action received for U.S. Appl. No. 14/568,101, dated Feb. 8, 2017, 14 pages.
Notice of Allowance received for U.S. Appl. No. 14/568,101, dated May 22, 2017, 12 pages.
Non-Final Office Action received for U.S. Appl. No. 14/880,166, dated Apr. 12, 2017, 11 pages.
Office Action received for European Patent Application No. 14194120.3, dated Apr. 4, 2017, 5 Pages.
Office Action received for United Kingdom Patent Application No. 1503156.0, dated Aug. 21, 2015, 4 pages.
Office Action received for United Kingdom Patent Application No. 1503156.0, dated Jun. 3, 2016, 1 page of Office Action.
Notice of Allowance received for Japanese Patent Application No. 2015-028528, dated Oct. 4, 2016, 3 pages of Japanese Notice of Allowance including 2 pages of English Translation.
Office Action received for Japanese Patent Application No. 2015-028528, dated May 24, 2016, 4 pages of Japanese Office Action including 2 pages of English Translation.
Alcantara et al., "Real-Time Parallel Hashing on the GPU" ACM Transactions on Graphics, Dec. 2009, 9 pages.
Deepakumara et al., "FPGA Implementation of MD5 Hash Algorithm", Canadian Conference on Electrical and Computer Engineering, vol. 2, 2001, 7 pages.
FIPS PUB 180-1, "Secure Hash Standard", Computer Security, Apr. 17, 1995, 17 pages.
Gopal et al., "Processing Multiple Buffers in Parallel to Increase Performance on Intel® Architecture Processors", Jul. 2010, 24 pages.
Gueron et al., "Parallelizing Message Schedules to Accelerate the Computations of Hash Functions", Jun. 5, 2012, 20 pages.
Guilford et al., "Fast SHA-256 Implementations on Intel® Architecture Processors", May 2012,18 pages.
Guilford et al., "Fast SHA512 Implementations on Intel® Architecture Processors", Intel® Intelligent System, Nov. 2012, 12 Pages.
Gulley et al. "Multi-Hash: A Family of Cryptgrpahic Hash Algorithm Extensions", Jul. 2012, 16 pages.
Järvinen et al., "Hardware Implementation Analysis of the MD5 Hash Algorithm", Proceedings of the 38th Hawaii International Conference on System Sciences, 2005, pp. 1-10.
Ma et al., "Hardware Performance Optimization and Evaluation of SM3 Hash Algorithm on FPGA", © Springer-Verlag Berlin Heidelberg, 2012, 14 pages.
Nakajima et al., "Performance Analysis and Parallel Implementation of Dedicated Hash Functions", 2002, 16 Pages.
International Search Report and Written Opinion received for PCT Patent Application No. PCT/US2015/065134, dated Jul. 11, 2016, 19 pages.
Abandonment from U.S. Appl. No. 15/911,620, dated Dec. 4, 2018, 2 pages.
Advisory Action from U.S. Appl. No. 15/600,200, dated Jul. 6, 2018, 3 pages.
Ao, et al., "A Compact Hardware Implementation of SM3 Hash Function," IEEE 13th International Conference on Trust, Security and Privacy in Computing and Communications, Sep. 2014, pp. 846-850.
Summons to attend oral proceedings pursuant to Rule 115(1) EPC for Application No. 14194120.3, dated Oct. 30, 2018, 6 pages.
Communication pursuant to Rules 70(2) and 70a(2) EPC for Application No. 15837850.5, dated Apr. 20, 2018, 1 page.
Decision of Refusal from foreign counterpart Japanese Patent Application No. 2017-511254, dated Dec. 4, 2018, 3 pages.
Extended European Search Report for Application No. 15837850.5, dated Apr. 4, 2018, 11 pages.
Final Office Action from U.S. Appl. No. 15/132,208, dated May 9, 2017, 6 pages.
Final Office Action from U.S. Appl. No. 15/600,200, dated Jan. 18, 2018, 33 pages.
First Office Action and Search Report from foreign counterpart Chinese Patent Application No. 201580040783.9, dated May 3, 2018, 46 pages. (English Translation available for Office Action only).
Gulley S., et al., "Intel SHA Extensions; New Instructions Supporting the Secure Hash Algorithm on Intel Architecture Processors," Paper, Jul. 2013, 22 Pages.
Hu Y., et al., "Hardware Design and Implementation of SM3 Hash Algorithm for Financial IC Card," Tenth International Conference on Computational Intelligence and Security, Nov. 2014, pp. 514-518.
Intel, "Intel 64 and IA-32 Architectures Software Developer's Manual," vol. 2 (2A and 2B): Instruction Set Reference, A-Z, Order No. 325383-039US, May 2011, 1643 Pages.
International Preliminary Report on Patentability for Application No. PCT/US2015/045169, dated Mar. 16, 2017, 8 pages.
International Preliminary Report on Patentability for Application No. PCT/US2015/065134, dated Mar. 1, 2018, 16 pages.
International Search Report and Written Opinion for Application No. PCT/US2015/045169, dated Nov. 27, 2015, 11 pages.
Kircanski A., et al., "Boomerang and Slide-Rotational Analysis of the SM3 Hash Function," International Conference on Selected Areas in Cryptography, SAC 2012, Aug. 15, 2012, pp. 304-320.
Kircanski A., et al., "Boomerang and Slide-Rotational Analysis of the SM3 Hash Function," Selected Areas in Cryptography, Springer, 2013, vol. 7707, pp. 304-320.
Mendal F., et al., "Finding collisions for round-reduced SM3," In Proceedings of the 13th international conference on Topics in Cryptology (CT-RSA'13), Feb. 2013, pp. 174-188.
Non-Final Office Action from U.S. Appl. No. 15/600,200, dated Oct. 4, 2018, 14 pages.
Non-Final Office Action from U.S. Appl. No. 15/132,208, dated Jul. 18, 2016, 17 pages.
Notice of Allowance from foreign counterpart Japanese Patent Application No. 2015-028528, dated Oct. 4, 2016, 3 pages.
Notice of Allowance from foreign counterpart Taiwan Patent Application No. 104127017, dated May 27, 2016, 4 pages.
Notice of Allowance from foreign counterpart United Kingdom Patent Application No. 1503156.0, dated Nov. 15, 2016, 2 pages.
Notice of Allowance from U.S. Appl. No. 13/731,004 dated, Sep. 2, 2014, 12 pages.
Notice of Allowance from U.S. Appl. No. 14/477,552, dated Dec. 21, 2015, 17 pages.
Notice of Allowance from U.S. Appl. No. 14/477,552, dated Mar. 1, 2016, 2 pages.
Notice of Allowance from U.S. Appl. No. 15/132,208, dated Feb. 7, 2018, 5 pages.

(56) References Cited

OTHER PUBLICATIONS

Notice of Allowance from U.S. Appl. No. 15/132,208, dated Jan. 19, 2018, 17 pages.
Notice of Allowance from U.S. Appl. No. 14/498,931, dated Jan. 13, 2017, 11 pages.
Notice of Preliminary Rejection from foreign counterpart Korean Patent Application No. 10-2017-7003127, dated Aug. 16, 2018, 9 pages.
Notification of Reasons for Refusal from foreign counterpart Japanese Patent Application No. 2017-51125, dated May 22, 2018, 4 pages.
Office Action and Search Report from foreign counterpart Taiwanese Patent Application No. 104105374, dated May 26, 2016, 18 pages.
Office Action from foreign counterpart United Kingdom Patent Application No. 1503156.0, dated Aug. 21, 2015, 4 pages.
U.S. Department of Commerce, Computer Systems Laboratory, "Secure Hash Standard," (FIPS PUB 180-1) Federal Information Processing Standards Publication, Washington D.C., Apr. 17, 1995, 24 pages.
Decision to Grant a Patent from counterpart Japanese Patent Application No. 2017-511254 dated May 7, 2019, 2 pages.
Final Office Action from U.S. Appl. No. 15/600,200, dated May 1, 2019, 25 pages.
Grant of Patent from foreign counterpart Korean Patent Application No. 10-2017-7003127, dated May 7, 2019, 6 pages.
Non-Final Office Action from U.S. Appl. No. 15/973,015, dated Apr. 17, 2019, 34 pages.
Partial Supplementary European Search Report for Application No. 15901867.0, dated Mar. 18, 2019, 18 pages.
Second Office Action from foreign counterpart Chinese Patent Application No. 201580040783.9, dated Apr. 9, 2019, 51 pages.

\* cited by examiner

FIG. 1

$ABCDEFGH \leftarrow V^{(i)}$

FOR $j = 0$ TO $63$ $SS1 \leftarrow ((A \lll 12) + E + (T_j \lll j)) \lll 7$ $SS2 \leftarrow SS1 \oplus (A \lll 12)$ $TT1 \leftarrow FF_j(A,B,C) + D + SS2 + W'_j$ $TT2 \leftarrow GG_j(E,F,G) + H + SS1 + W_j$ $D \leftarrow C$ $C \leftarrow B \lll 9$ $B \leftarrow A$ $A \leftarrow TT1$ $H \leftarrow G$ $G \leftarrow F \lll 19$ $F \leftarrow E$ $E \leftarrow P_0(TT2)$

ENDFOR $V^{(i+1)} \leftarrow ABCDEFGH \oplus V^{(i)}$

METHOD
IN PROCESSOR
330

RECEIVE INSTRUCTION INDICATING FIRST SOURCE PACKED DATA OPERAND AND INDICATING SECOND SOURCE PACKED DATA OPERAND, FIRST AND SECOND SOURCE PACKED DATA OPERANDS EACH INCLUDING PLURALITY OF DATA ELEMENTS, DATA ELEMENTS OF FIRST AND SECOND SOURCE PACKED DATA OPERANDS INCLUDING PLURALITY OF MESSAGES ASSOCIATED WITH COMPRESSION FUNCTION OF SM3 HASH FUNCTION AND COLLECTIVELY INCLUDING INFORMATION SUFFICIENT TO EVALUATE $P_1(W_{J-16}$ XOR $W_{J-9}$ XOR $(W_{J-3} <<< 15))$ XOR $(W_{J-13} <<< 7)$ XOR $W_{J-6}$

WHERE $P_1(X) = X$ XOR $(X<<<15)$ XOR $(X<<<23)$

WHERE $W_{J-16}$, $W_{J-9}$, $W_{J-3}$, AND $W_{J-6}$ ARE MESSAGES ASSOCIATED WITH COMPRESSION FUNCTON OF SM3 HASH FUNCTION
~331

STORE RESULT PACKED DATA IN DESTINATION INDICATED BY INSTRUCTION, IN RESPONSE TO INSTRUCTION, RESULT PACKED DATA INCLUDING $W_J$ MESSAGE TO BE INPUT TO ROUND J OF COMPRESSION FUNCTION OF SM3 HASH FUNCTION
~332

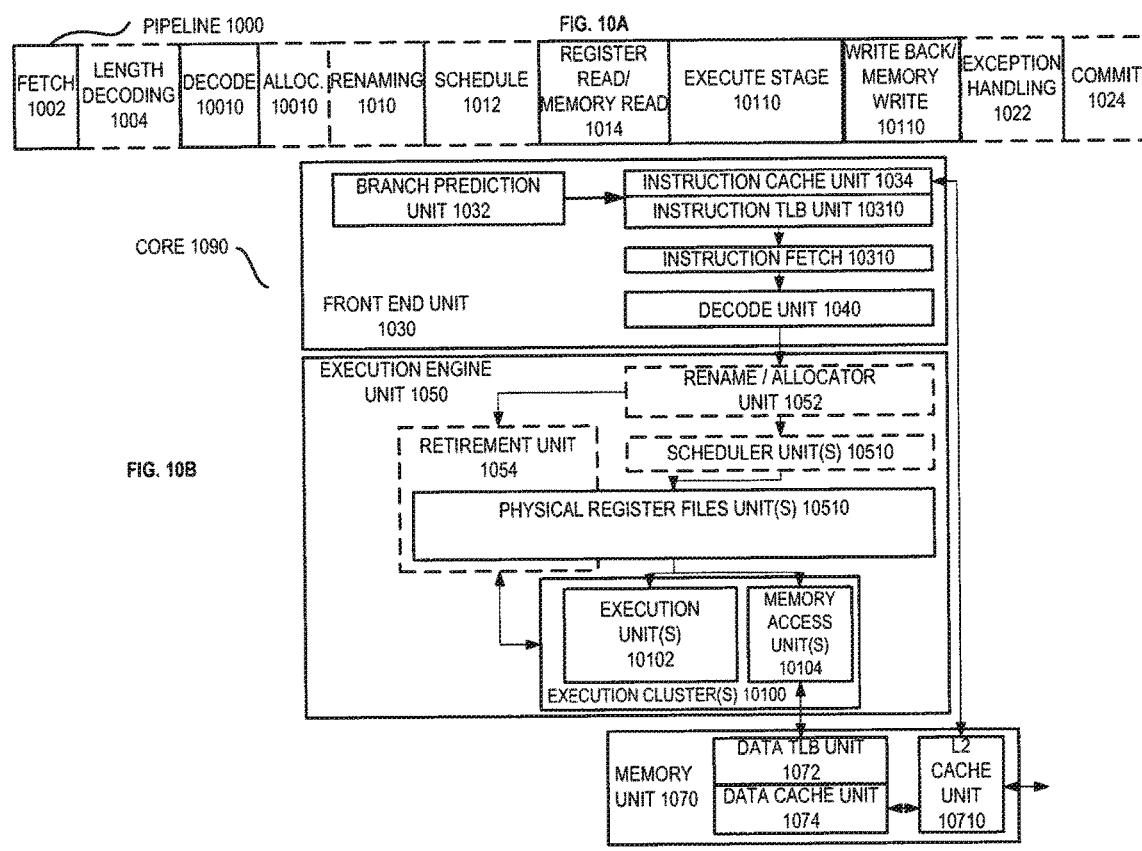

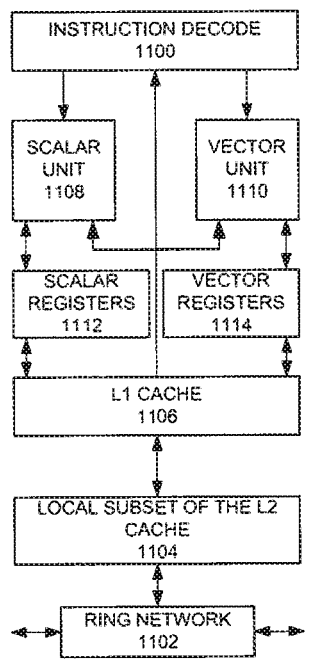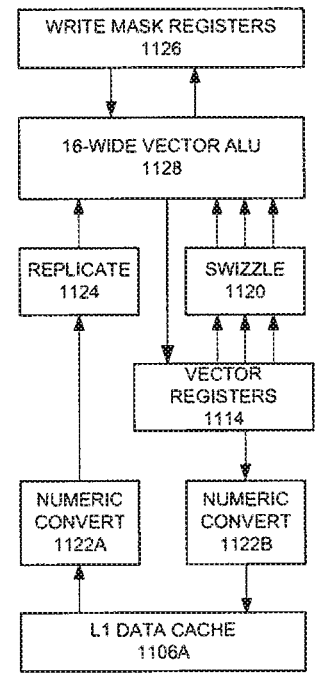

SM3 HASH FUNCTION MESSAGE EXPANSION PROCESSORS, METHODS, SYSTEMS, AND INSTRUCTIONS

BACKGROUND

1. Technical Field

Embodiments generally relate to processors. In particular, embodiments generally relate to evaluating hash functions with processors.

2. Background Information

Hash functions are a type of cryptographic functions that are widely used in computer systems and other electronic devices. The hash functions generally take a message as an input, generate a corresponding hash value by applying the hash function to the message, and output a hash value. Typically, the same hash value should be generated if the same hash function is evaluated with the same message. Such hash functions are used for various purposes, such as for verification (e.g., verifying the integrity of files, data, or messages), identification (e.g., identifying files, data, or messages), authentication (e.g., generating message authentication codes), generating digital signatures, generating pseudorandom numbers, and the like. As one illustrative example, a hash function may be used to generate a hash value for a given message. At a later time, a hash value may be recomputed for the message using the same hash function. If the hash values are identical, then it can be assumed that the message hasn't been changed. In contrast, if the hash values are different, then it can be assumed that the message has been changed.

One known type of hash function or secure hashing algorithm is the SM3 hash function, which has been published by the Chinese Commercial Cryptography Association Office. An English language description of the SM3 hash function has been published as the Internet Engineering Task Force (IETF) Internet-Draft entitled "SM3 Hash Function," by S. Shen and X. Lee, on Oct. 24, 2011. SM3 is currently specified as the hashing algorithm for the TCM (Trusted Computing Module) by the China Information Security Standardization Technical Committee (TC260) initiative. For a message of a given length, the SM3 hash algorithm generates a hash value having a length of 256-bits after padding and iterative compression. The iterative procedure involves dividing the message after padding into 512-bit blocks. The iterative procedure is then performed on the sequence of 512-bit blocks with the output state of the intermediate blocks serving as the input state for the next 512-bit SM3 block compression. The state of each intermediate block compression and the final hash value is a 256-bit value.

FIG. 1 illustrates the compression function 100 of the SM3 hash function. A detailed understanding of the compression function is not important to understand the embodiments disclosed herein. However, the compression function will be briefly described. Initially, the 256-bit state value $V^{(i)}$ is partitioned into eight 32-bit words A, B, C, D, E, F, G, and H. The initial state value for the first iteration is a constant defined by the SM3 hash function. The words A-H are specified in "Big Endian" format. A sequence of iterations from j=0 to 63 will be performed. In subsequent iterations, the input state value $V^{(i)}$ is the output state value from the prior iteration $V^{(i+1)}$. The leftward pointing arrow symbol (←) represents storing or assigning the value on the right to the parameter on the left. The symbol "<<<" represents a rotate operation. The symbol resembling a plus sign with a circle around it represents a logical exclusive OR (XOR) operation. $T_j$ is a constant having a value that depends on the iteration (i.e., the value of j) as specified in the SM3 hash function. The variables SS1, SS2, TT1, and TT2 are internal intermediate values used in the iteration. $FF_j$ and $GG_j$ are Boolean functions specified in the SM3 hash algorithm. P0 is a permutation function specified in the SM3 hash algorithm. The particulars of the functions $FF_j$, $GG_j$, and P0 are not particularly relevant to an understanding of this description, and will be omitted for simplicity.

Notice that the term $W_j$ is added to the evaluation of the Boolean function GGj. Notice also that the term $W'_j$ is added to the evaluation of the Boolean function $FF_j$. The terms $W_j$ and $W'_j$ represent message terms, message inputs, or simply messages. For iterations 0 to 15, the terms $W_0$ to $W_{15}$ are obtained from the 512-bit block being compressed. In particular, the 512-bit message block being compressed is divided or partitioned into sixteen 32-bit words referenced in big-endian format as $W_0$ to $W_{15}$. The remaining messages $W_j$ and $W'_j$ are calculated during a message extension or message expansion portion of the SM3 hash algorithm.

BRIEF DESCRIPTION OF THE DRAWINGS

The invention may best be understood by referring to the following description and accompanying drawings that are used to illustrate embodiments. In the drawings:

FIG. 1 illustrates the compression function of the SM3 hash function.

FIG. 3 is a block flow diagram of an embodiment of a method of performing an embodiment of a SM3 message expansion instruction.

FIG. 10A is a block diagram illustrating both an exemplary in-order pipeline and an exemplary register renaming, out-of-order issue/execution pipeline according to embodiments of the invention.

FIG. 10B is a block diagram illustrating both an exemplary embodiment of an in-order architecture core and an exemplary register renaming, out-of-order issue/execution architecture core to be included in a processor according to embodiments of the invention.

FIG. 11A is a block diagram of a single processor core, along with its connection to the on-die interconnect network and with its local subset of the Level 2 (L2) cache, according to embodiments of the invention.

FIG. 11B is an expanded view of part of the processor core in FIG. 11A according to embodiments of the invention.

DETAILED DESCRIPTION OF EMBODIMENTS

Figure 2:
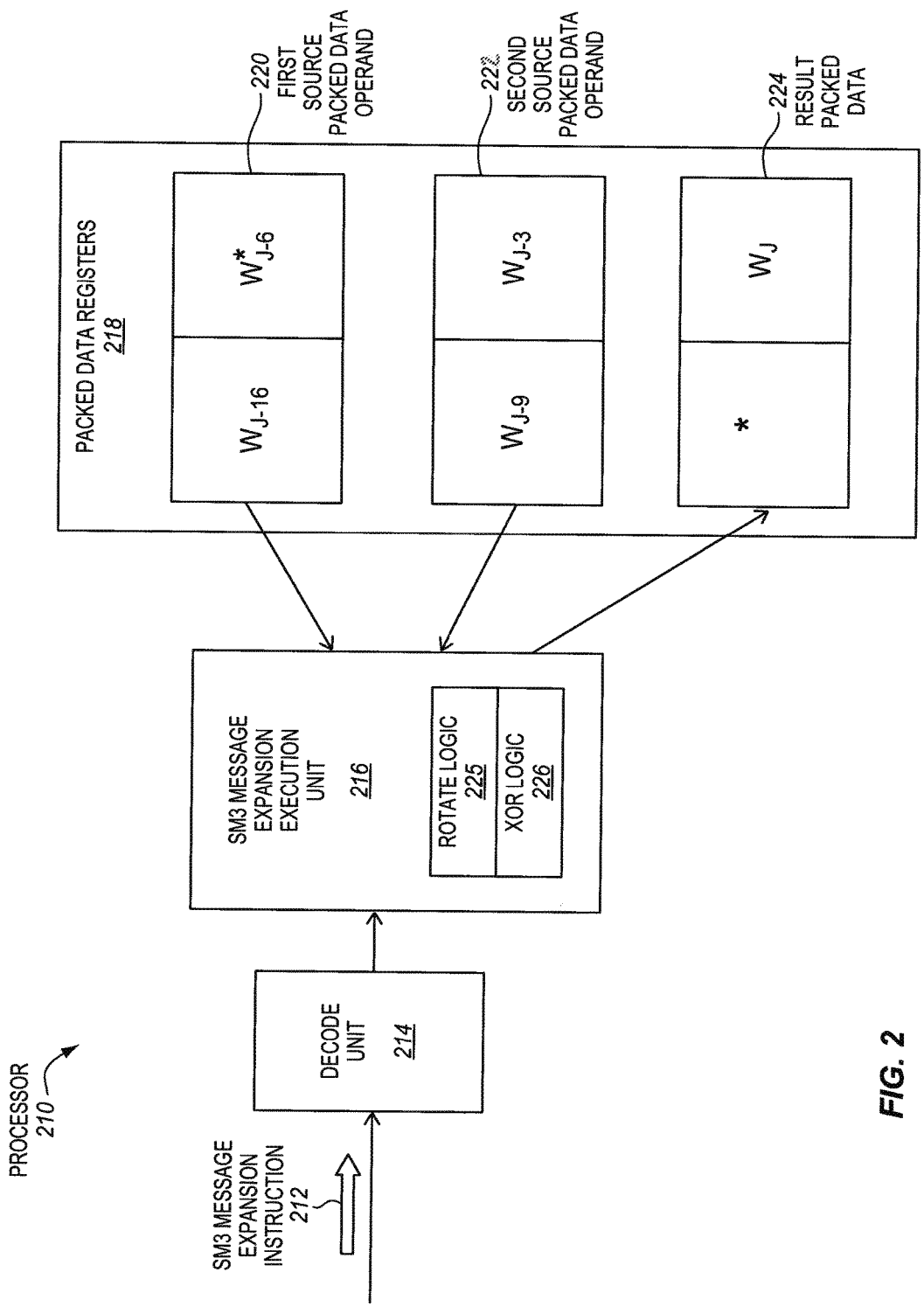
FIG. 2 is a block diagram of an embodiment of a processor operable to perform an embodiment of an SM3 hash function message expansion instruction.

Disclosed herein are SM3 hash function message expansion instructions, processors to execute the instructions, methods performed by the processors when processing or executing the instructions, and systems incorporating one or more processors to process or execute the instructions. In the following description, numerous specific details are set forth (e.g., specific instruction operations, data formats, organizations of data within operands, processor configurations, micro-architectural details, sequences of operations, etc.). However, embodiments may be practiced without these specific details. In other instances, well-known circuits, structures and techniques have not been shown in detail to avoid obscuring the understanding of the description.

In some embodiments, an SM3 hash function message expansion instruction may be used to calculate or otherwise generate one or more messages that are to be used in the compression function of the SM3 hash function. As described in the background section, the $W_j$ messages are added to the evaluation of the Boolean function GGj. The $W'_j$ messages are added to the evaluation of the Boolean function $FF_j$. For iterations 0 to 15, the terms $W_0$ to $W_{15}$ are obtained from the 512-bit block being compressed. In particular, the 512-bit message block being compressed is divided or partitioned into sixteen 32-bit words referenced in big-endian format as $W_0$ to $W_{15}$. The remaining messages are calculated during a message extension or message expansion portion of the SM3 hash algorithm.

The $W_j$ messages for iterations 16 to 63 may be calculated according to the following Equation 1:

$$W_j = P1(W_{j-16}\ XOR\ W_{j-9}\ XOR(W_{j-3} <<< 15))XOR$$

$$(W_{j-13} <<< 7) XOR\ W_{j-6} \qquad \text{Equation 1}$$

In Equation 1, P1 is a permutation function that is defined by the following Equation 2:

$$P1(X) = X\ XOR(X <<< 15)XOR(X <<< 23) \qquad \text{Equation 2}$$

The $W_j$ messages for iterations 16 to 63 may be calculated according to Equation 1 with the permutation function P1 according to Equation 2. Notice that the calculation of a $W_j$ message for a given round (e.g., round j) depend on messages from earlier rounds. In particular, as can be readily seen in Equation 1, the $W_j$ message for a given round (e.g., round j) depends on the prior round messages $W_{j-16}$, $W_{j-13}$, $W_{j-9}$, $W_{j-6}$, and $W_{j-3}$. $W_{j-3}$ is the message from three rounds back, $W_{j-16}$ is the message from sixteen rounds back, and so on. Since $W_{j-3}$ is the message from three rounds prior, at most three new messages for three new rounds (e.g., $W_j$, $W_{j+1}$, $W_{j+2}$) can be calculated fully in parallel. Attempting to calculate a fourth new message (e.g., $W_{j+3}$) for a fourth round would depend on the message from the third prior round (e.g., $W_j$), which has not yet been calculated, which can be done but the delay is greater. This dependency tends to limit full parallelism beyond calculating three new messages for three new rounds.

The $W'_j$ messages may be calculated from the $W_j$ messages. In particular, the $W'_j$ messages may be calculated from the $W_j$ messages according to the following Equation 3:

$$W'_j = XOR\ W_{j+4} \qquad \text{Equation 3}$$

Notice that the $W'_j$ message depends on the $W_j$ message from the same round as well as on the $W_{j+4}$ message from four rounds prior. Since $W_0$ to $W_{15}$ are divided or obtained from the 512-bit message block being compressed, messages $W'_0$ to $W'_{11}$ may be determined using Equation 3 based on the initially known messages $W_0$ to $W_{15}$. The remaining messages $W'_{12}$ to $W'_{63}$ may be determined from messages $W_{16}$ to $W_{67}$, which may be calculated using Equations 1 and 2. Notice that $W_{64}$ to $W_{67}$ may be calculated even though they are not input directly into the compression function but are needed indirectly to calculate $W'_{60}$ to $W'_{63}$.

As can be readily seen from Equations 1 and 2, calculating a single $W_j$ message may involve number of different operations. For example, calculating a single $W_j$ message may involve performing around six XOR operations and four rotate operations. In addition, a large number of such $W_j$ messages need to be generated (e.g., $W_{16}$ to $W_{67}$). The $W'_{12}$ to $W'_{63}$ messages also need to be calculated using Equation 3. Conventionally, without the SM3 hash function message expansion instructions disclosed herein, calculating these messages generally tends to involve executing a large number of instructions. Commonly, generating each $W_j$ message may take several instructions. For example, conventionally it is possible that a separate instruction may be used for each of the six XOR operations and for each of the four rotate operations. Additional instructions may potentially be needed to move or rearrange data, or the like, depending on the particular implementation. The performance of the message expansion in software by such individual general-purpose instructions generally tends to be poor due in part to the number of dependent operations involved in the message expansion. This fact, compounded with the large number of $W_j$ messages that need to be generated (e.g., $W_{16}$ to $W_{67}$), tends to make the implementation of the message expansion portion of the SM3 hash function very computationally intensive and/or take a significant amount of time. Reducing the number of instructions needed for message expansion may help to increase performance. As will be explained further below, some embodiments allow one message, two messages, or three messages to be substantially calculated by performing a single SM3 hash function message expansion instruction.

FIG. 2 is a block diagram of an embodiment of a processor 210 operable to perform an embodiment of an SM3 hash function message expansion instruction 212. In some embodiments, the processor may be a general-purpose processor (e.g., of the type commonly used in desktop, laptop, or other computers). Alternatively, the processor may be a special-purpose processor. Examples of suitable special-purpose processors include, but are not limited to, cryptographic processors, cryptographic co-processors, communications processors, network processors, graphics processors, co-processors, embedded processors, digital signal processors (DSPs), to name just a few examples. The processor may be any of various complex instruction set computing (CISC) processors, various reduced instruction set computing (RISC) processors, various very long instruction word (VLIW) processors, various hybrids thereof, or other types of processors.

During operation, the processor 210 may receive the SM3 hash function message expansion instruction 212. For simplicity, this instruction may also be referred to herein simply as an SM3 message expansion instruction. The SM3 message expansion instruction may be received from an instruction fetch unit, an instruction queue, or the like. The SM3 message expansion instruction may represent a macroinstruction, assembly language instruction, machine code instruction, or other instruction or control signal of an instruction set of the processor. In some embodiments, the SM3 message expansion instruction may explicitly specify (e.g., through one or more fields or a set of bits), or otherwise indicate (e.g., implicitly indicate), a first source packed data operand 220, may explicitly specify or otherwise indicate a second source packed data operand 222, and in some embodiments may explicitly specify or otherwise indicate a destination operand (e.g., a destination storage location) where a result packed data 224 is to be stored. The first and second source packed data operands may each include a plurality of data elements.

In some embodiments, the data elements of the first and second source packed data operands may include information sufficient to evaluate Equation 1:

$$W_j = P1(W_{j-16} \text{ XOR } W_{j-9} \text{ XOR}(W_{j-3} <<< 15)) \text{XOR}$$

$$(W_{j-13} <<< 7) \text{XOR } W_{j-6} \quad \text{Equation 1}$$

where P1 is a permutation function defined by Equation 2:

$$P1(X) = X \text{ XOR}(X <<< 15) \text{XOR}(X <<< 23) \quad \text{Equation 2}$$

Evaluating Equation 1 includes generating a value that would be generated by Equation 1 and includes the possibility of some calculations from Equation 1 being performed previously (e.g., to generate logical combinations), as will be described further below. In this relation, $W_{j-16}$, $W_{j-9}$, $W_{j-3}$, $W_{j-13}$, and $W_{j-6}$ are five messages of the compression function of the SM3 hash function. XOR is an exclusive OR operation. The symbol <<< designates a rotate operation.

The data elements of the first and second source packed data operands may include information sufficient to evaluate the relation of Equation 1 in different ways. In some embodiments, the data elements may optionally provide all five of the messages $W_{j-16}$, $W_{j-9}$, $W_{j-3}$, $W_{j-13}$, and $W_{j-6}$ appearing in Equation 1. In other embodiments, the data elements may provide only a subset of the five messages $W_{j-16}$, $W_{j-9}$, $W_{j-3}$, $W_{j-13}$, and $W_{j-6}$ appearing in Equation 1, as well as a combination of a second different subset of the five messages $W_{j-16}$, $W_{j-9}$, $W_{j-3}$, $W_{j-13}$, and $W_{j-6}$ appearing in Equation 1. For example, the combination may be an already calculated logical combination of two messages according to Equation 1. One example of a suitable combination is $W^*_{j-6}$, which is defined by the following Equation 4:

$$W^*_{j-6} = (W_{j-13} <<< 7) \text{XOR } W_{j-6} \quad \text{Equation 4}$$

In the illustrated embodiment of FIG. 2, the data elements of the first and second source packed data operands include $W_{j-16}$, $W_{j-9}$, $W_{j-3}$, and $W^*_{j-6}$. As shown in Equation 4, $W^*_{j-6}$ is a logical combination of message $W_{j-6}$ and rotated message $W_{j-13}$. $W^*_{j-6}$ represents a small piece of Equation 1 that may optionally be evaluated outside of the SM3 message expansion instruction. The messages $W_{j-16}$, $W_{j-9}$, and $W_{j-3}$, and the combination $W^*_{j-6}$ represent an example of information sufficient to evaluate Equation 1. It is to be appreciated that the particular illustrated arrangement of $W_{j-16}$, $W_{j-9}$, $W_{j-3}$, and $W^*_{j-6}$ within the first and second source packed data operands is not required. Rather, these values may optionally be moved around variously within the first and second source packed data operands as desired.

The combination $W^*_{j-6}$ effectively groups two messages into a same single value (e.g., a 32-bit data element). Rather than the source operands needing to use two 32-bit data elements to specify two different messages, a single 32-bit data element may be used to specify a combination of the two messages. This may optionally be used when the available number of data elements in the source operands do not permit specifying all of the messages. Alternatively, all of the messages needed for the evaluation of Equation 1 may optionally be explicitly specified in the source operands if they have enough data elements to explicitly specify all such messages. One example of possible messages in the source operands is provided, although it is to be appreciated that in various embodiments, the first and second source packed data operands may optionally specify the information shown in any of FIGS. 4-6, or other information described elsewhere herein.

Referring again to FIG. 2, the processor includes a decode unit or decoder 214. The decode unit may receive and decode the SM3 message expansion instruction. The decode unit may output one or more microinstructions, microoperations, micro-code entry points, decoded instructions or control signals, or other relatively lower-level instructions or control signals that reflect, represent, and/or are derived from the SM3 message expansion instruction. The one or more relatively lower-level instructions or control signals may implement the relatively higher-level SM3 message expansion instruction through one or more relatively lower-level (e.g., circuit-level or hardware-level) operations. In some embodiments, the decode unit may include one or more input structures (e.g., port(s), interconnect(s), an interface) to receive the instruction, an instruction recognition logic coupled with the input structure(s) to recognize the instruction, a decode logic coupled with the recognition logic to decode the instruction into the one or more corresponding lower-level instructions or control signals, and one or more output structures (e.g., port(s), interconnect(s), an interface) coupled with the decode logic to output the one or more corresponding lower level instructions or control signals. The recognition logic and the decode logic may be implemented using various different mechanisms including, but not limited to, microcode read only memories (ROMs), look-up tables, hardware implementations, programmable logic arrays (PLAs), and other mechanisms used to implement decode units known in the art.

In some embodiments, instead of the SM3 message expansion instruction being provided directly to the decode unit, an instruction emulator, translator, morpher, interpreter, or other instruction conversion module may optionally be used. Various different types of instruction conversion modules are known in the arts and may be implemented in software, hardware, firmware, or a combination thereof. In some embodiments, the instruction conversion module may be located outside the instruction processing processor, such as, for example, on a separate die and/or in a memory (e.g., as a static, dynamic, or runtime instruction emulation module). By way of example, the instruction conversion module may receive the SM3 message expansion instruction which may be of a first instruction set and may emulate, translate, morph, interpret, or otherwise convert the SM3 message expansion instruction into one or more corresponding or derived intermediate instructions or control signals which may be of a second different instruction set. The one or more instructions or control signals of the second instruction set may be provided to a decode unit that is operable to decode instructions or control signals of the second instruction set. The decode unit may decode the received one or more instructions or control signals of the second instruction set into one or more lower-level instructions or control signals executable by native hardware of the processor (e.g., one or more execution units).

The processor 210 also includes a set of packed data registers 218. Each of the packed data registers may represent an on-die storage location that is operable to store packed data, vector data, or SIMD data. The packed data registers may represent architecturally-visible registers (e.g., an architectural register file). The architecturally-visible or architectural registers are visible to software and/or a programmer and/or are the registers indicated by instructions of an instruction set of the processor to identify operands. These architectural registers are contrasted to other non-architectural or non-architecturally visible registers in a given microarchitecture (e.g., temporary registers, reorder buffers, retirement registers, etc.). In some embodiments, the first source packed data operand 220 may be stored in a first packed data register, and the second source packed data operand 222 may be stored in a second packed data register. Alternatively, memory locations, or other storage locations, may be used for one or more of these operands. The packed data registers may be implemented in different ways in different microarchitectures using well-known techniques and are not limited to any particular type of circuit. Various different types of registers are suitable. Examples of suitable types of registers include, but are not limited to, dedicated physical registers, dynamically allocated physical registers using register renaming, and combinations thereof.

Referring again to FIG. 2, an SM3 hash function message expansion execution unit 216 is coupled with the decode unit 214 and the packed data registers 218. For simplicity, the SM3 hash function message expansion execution unit may also be referred to herein as an SM3 execution unit, message expansion execution unit, or simply execution unit. The execution unit may receive the one or more decoded or otherwise converted instructions or control signals that represent and/or are derived from the SM3 message expansion instruction 212. The execution unit may also receive the first source packed data operand 220 and the second source packed data operand 222. The execution unit is operable in response to and/or as a result of the SM3 message expansion instruction (e.g., in response to one or more instructions or control signals decoded from the instruction) to store the result packed data 224 in the destination operand (e.g., a destination storage location) indicated by the instruction.

In some embodiments, the result packed data 224 may include a $W_j$ message corresponding to a round j of the compression function of the SM3 hash function (e.g., to be input to the round j of the compression function). As shown in the illustration, the $W_j$ message may be stored in the result packed data. The result packed data may also have another data element, which is indicated by an asterisk (*) to indicate that it is a don't care value (e.g., an existing value may be left unchanged, zero or another predetermined value may be stored, etc.). In some embodiments, the SM3 message expansion execution unit may be operable to use the data elements of the first and second source packed data operands to evaluate Equations 1 and 2. Evaluating Equations 1 and 2 means evaluating a value consistent with Equations 1 and 2 not necessarily performing each operation shown in Equations 1 and 2. In some embodiments, each operation shown in Equations 1 and 2 may optionally be performed. In other embodiments, some operations may optionally be carved out and performed prior to the SM3 message expansion instruction. For example, as mentioned above, the operations of Equation 4 to generate the $W^*_{j-6}$ logical combination term may optionally be performed outside of the confines of the execution of the SM3 message expansion instruction.

In some embodiments, where the instruction implicitly indicates that a register or other storage location used for a source packed data operand is to be reused again as a destination storage location to store the result packed data, which is not required, the $W_j$ message may be written over one of the source data elements. In some embodiments, the $W_j$ message may optionally be written over a combination term (e.g., $W^*_{j-6}$) instead of over one of the messages (e.g., instead of being written over $W_{j-16}$, $W_{j-9}$ or $W_{j-3}$). This may potentially offer an efficiency or performance advantage from an algorithmic perspective, since the messages may potentially be more useful to preserve for evaluation of other messages as compared to the logical combinations, as will be described further below, but is not required.

In the illustrated example, the result packed data has only a single new message $W_j$. In some embodiments, in addition to the $W_j$ message, the result packed data may also optionally include a $W_{j+1}$ message to be input to a round j+1 of the compression function. In some embodiments, in addition to the $W_j$ and $W_{j+1}$ messages, the result packed data may also optionally include a $W_{j+2}$ message to be input to a round j+2 of the compression function. In some embodiments, the result packed data 224 may include the result packed data of any of FIGS. 4-6, or other result packed data described herein, although the scope of the invention is not so limited.

The SM3 message expansion execution unit and/or the processor may include specific or particular logic (e.g., transistors, integrated circuitry, or other hardware potentially combined with firmware (e.g., instructions stored in non-volatile memory) and/or software) that is operable to perform the SM3 message expansion instruction and/or store the result in response to the SM3 message expansion instruction (e.g., in response to one or more instructions or control signals decoded from the SM3 message expansion instruction). In some embodiments, the execution unit may include one or more input structures (e.g., port(s), interconnect(s), an interface) to receive source operands, circuitry and/or logic coupled with the input structure(s) to process the source operands and generate the result operand, and one or more output structures (e.g., port(s), interconnect(s), an interface) coupled with the circuitry and/or logic to output the result operand. In some embodiments, the execution unit may include rotate logic 225 and XOR logic 226. In some embodiments, the execution unit may include the logic of FIG. 7, although the scope of the invention is not so limited.

To avoid obscuring the description, a relatively simple processor 210 has been shown and described. The processor may optionally include other well-known components. Possible examples of such components include, but are not limited to, an instruction fetch unit, instruction and data caches, second or higher level caches, out-of-order execution logic, an instruction scheduling unit, a register renaming unit, a retirement unit, a bus interface unit, instruction and data translation lookaside buffers, prefetch buffers, microinstruction queues, microinstruction sequencers, other components included in processors, and various combinations thereof. Numerous different combinations and configurations of such components are suitable. Embodiments may be included in processors have multiple cores, logical processors, or execution engines at least one of which has a decode unit and an execution unit to perform an embodiment of a SM3 message expansion instruction.

FIG. 3 is a block flow diagram of an embodiment of a method 330 of performing an embodiment of a SM3 message expansion instruction. In various embodiments, the method may be performed by a processor, instruction processing apparatus, or other digital logic device. In some embodiments, the operations and/or method of FIG. 3 may be performed by and/or within the processor of FIG. 2. The components, features, and specific optional details described herein for the processor of FIG. 2 also optionally apply to the operations and/or method of FIG. 3. Alternatively, the operations and/or method of FIG. 3 may be performed by and/or within a similar or different processor or apparatus. Moreover, the processor of FIG. 2 may perform operations and/or methods the same as, similar to, or different than those of FIG. 3.

The method includes receiving the SM3 message expansion instruction, at block 331. In various aspects, the instruction may be received at a processor, an instruction processing apparatus, or a portion thereof (e.g., an instruction fetch unit, a decode unit, a bus interface unit, etc.). In various aspects, the instruction may be received from an off-die source (e.g., from memory, interconnect, etc.), or from an on-die source (e.g., from an instruction cache, instruction queue, etc.). The SM3 message expansion instruction may specify or otherwise indicate a first source packed data operand and a second source packed data operand. The first and second source packed data operands may each include a plurality of data elements.

In some embodiments, the data elements of the first and second source packed data operands may include information sufficient to evaluate Equation 1:

$$W_j = P1(W_{j-16} \text{ XOR } W_{j-9} \text{ XOR}(W_{j-3} <<< 15)) \text{XOR}$$

$$(W_{j-13} <<< 7) \text{XOR } W_{j-6} \quad \text{Equation 1}$$

where P1 is a permutation function defined by Equation 2:

$$P1(X) = X \text{ XOR}(X <<< 15) \text{XOR}(X <<< 23) \quad \text{Equation 2}$$

and where $W_{j-16}$, $W_{j-9}$, $W_{j-3}$, $W_{j-13}$, and $W_{j-6}$ are five messages of the compression function of the SM3 hash function.

In some embodiments, the data elements may optionally provide all five of the messages $W_{j-16}$, $W_{j-9}$, $W_{j-3}$, $W_{j-13}$, and $W_{j-6}$ appearing in Equation 1. In other embodiments, the data elements may provide only a subset of the five messages $W_{j-16}$, $W_{j-9}$, $W_{j-3}$, $W_{j-13}$, and $W_{j-6}$ appearing in Equation 1, as well as a combination of a second different subset of the five messages $W_{j-16}$, $W_{j-9}$, $W_{j-3}$, $W_{j-13}$, and $W_{j-6}$ appearing in Equation 1. For example, in one embodiment, the data elements may provide messages $W_{j-16}$, $W_{j-9}$, and $W_{j-3}$, and a logical combination $W^*_{j-6}$ representing the logical combination defined by Equation 4.

A result packed data may be stored in a destination operand (e.g., a destination register or other destination storage location) indicated by the SM3 message expansion instruction in response to and/or as a result of the SM3 message expansion instruction, at block 332. Representatively, an execution unit, instruction processing apparatus, or processor may perform the instruction and store the result. In some embodiments, the result packed data may include a $W_j$ message to be input to a round j of the compression function of the SM3 hash function. In some embodiments, the result packed data may also include a $W_{j+1}$ message to be input to a round j+1 of the compression function, and in some embodiments also optionally a $W_{j+2}$ message to be input to a round j+2 of the compression function. In some embodiments, the result packed data may be any of those described for FIGS. 4-6, although the scope of the invention is not so limited.

In some embodiments, the result packed data may include a $W_j$ message corresponding to a round j of the compression function of the SM3 hash function (e.g., to be input to the round j of the compression function). In some embodiments, the data elements of the first and second source packed data operands may be used to evaluate Equations 1 and 2. In some embodiments, all operations shown in Equations 1 and 2 may actually be performed responsive to the instruction. In other embodiments some operations (e.g., the operations shown in Equation 4 to generate the logical combination $W^*_{j-6}$), may be carved out of the confines of execution of the instruction. In some embodiments, the $W_j$ message may optionally be stored over a logical combination term (e.g., $W^*_{j-6}$) instead of over one of the messages explicitly specified in the source operands, although this is not required. In some embodiments, instead of just a single message $W_j$, the result packed data may also optionally include a $W_{j+1}$ message to be input to a round j+1 of the compression function, and in some embodiments also a $W_{j+2}$ message to be input to a round j+2 of the compression function. In some embodiments, the result packed data may include the result packed data of any of FIGS. 4-6, or other result packed data described herein, although the scope of the invention is not so limited.

The illustrated method involves architectural operations (e.g., those visible from a software perspective). In other embodiments, the method may optionally include one or more microarchitectural operations. By way of example, the instruction may be fetched, decoded, scheduled out-of-order, source operands may be accessed, an execution unit may perform microarchitectural operations to implement the instruction, results may be rearranged back into program order, etc. In some embodiments, the microarchitectural operations to implement the instruction may optionally include any of those shown in FIG. 7.

Figure 4:
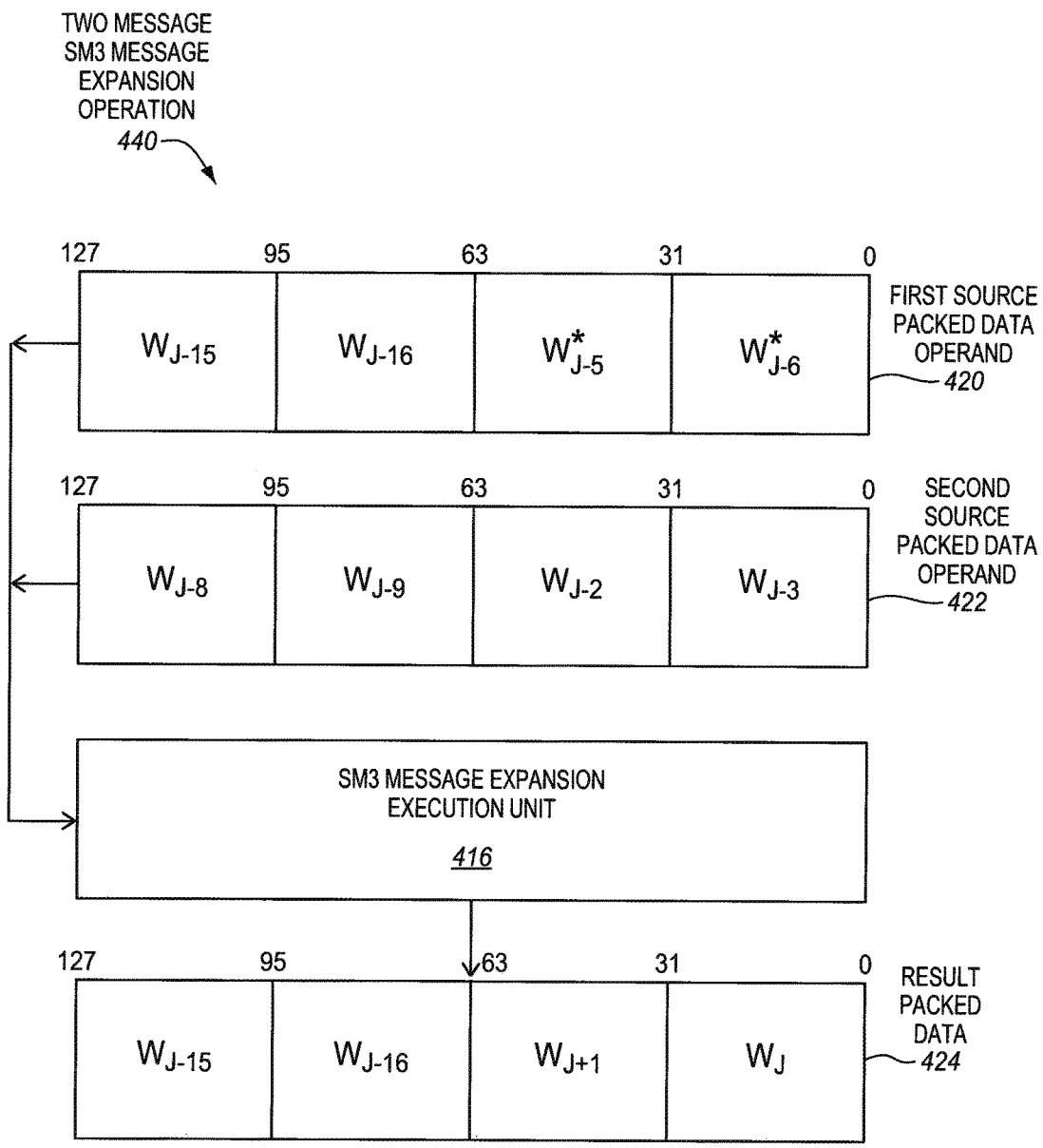
FIG. 4 is a block diagram of an embodiment of a two message SM3 message expansion operation.

FIG. 4 is a block diagram illustrating an embodiment of a two message SM3 message expansion operation 440 that may be performed in response to an embodiment of a two message SM3 message expansion instruction. The instruction may specify or otherwise indicate a first source packed data operand 420. The instruction may also specify or otherwise indicate a second source packed data operand 422. In various embodiments, the source operands may be stored in packed data registers, memory locations, or other storage locations. As shown, in some embodiments the instruction may indicate as source operands only these two source operands. The first and second source packed data operands may each have a plurality of data elements. In the illustrated embodiment, each of the first and second source packed data operands is a 128-bit operand that has four 32-bit data elements. The first and second source packed data operands together have a total of eight 32-bit data elements.

In some embodiments, the data elements of the first and second source packed data operands may collectively include information sufficient to evaluate Equation 1 and Equation 5:

$$W_j = P1(W_{j-16} \text{ XOR } W_{j-9} \text{ XOR}(W_{j-3} <<< 15)) \text{XOR}$$

$$(W_{j-13} <<< 7) \text{XOR } W_{j-6} \quad \text{Equation 1}$$

$$W_{j+1} = P1(W_{j-15} \text{ XOR } W_{j-8} \text{ XOR}(W_{j-2} <<< 15)) \text{XOR}$$

$$(W_{j-12} <<< 7) \text{XOR } W_{j-5} \quad \text{Equation 5}$$

where P1 is a permutation function defined by Equation 2:

$$P1(X) = X \text{ XOR} (X<<<15) \text{XOR} (X<<<23) \quad \text{Equation 2}$$

Equation 1 is used to generate a current round message $W_j$, whereas Equation 5 is used to generate a next round message $W_{j+1}$ that is one round later than $W_j$. Notice that Equations 1 and 5 include ten messages. In particular, Equation 1 includes the five messages $W_{j-16}$, $W_{j-9}$, $W_{j-3}$, $W_{j-13}$, and $W_{j-6}$. Similarly, Equation 5 includes the five messages $W_{j-15}$, $W_{j-8}$, $W_{j-2}$, $W_{j-12}$, and $W_{j-5}$. The messages in Equation 1 are each for one round prior to the corresponding messages in Equation 5. In this embodiment, since the first and second source packed data operands are only able to provide eight data elements in total, not all ten messages needed to evaluate Equations 1 and 5 can be explicitly provided by the first and second source packed data operands. Instead, in some embodiments, two data elements may each be used to provide a value representing a logical combination of two messages each, instead of explicitly providing all four of these messages separately.

Referring again to FIG. 4, in the illustrated embodiment, the first and second source packed data operands are used to store six of the ten messages needed to evaluate Equations 1 and 5. In particular, of the five messages needed to evaluate Equation 1, a subset of only the three messages $W_{j-16}$, $W_{j-9}$, and $W_{j-3}$ are explicitly stored. Similarly, of the five messages needed to evaluate Equation 5, a subset of only the three messages $W_{j-15}$, $W_{j-8}$, and $W_{j-2}$ are explicitly stored. These messages occupy six of the eight data elements available in the source operands. Each of the remaining two data elements in the source operands may be used to store a logical combination of two messages each. In the illustrated embodiment, one of the two remaining data elements may store a first logical combination $W^*_{j-6}$ which represents and/or is equal to $W_{j-13}<<<7)$ XOR $W_{j-6}$. $W_{j-13}$ and $W_{j-6}$ are two messages from Equation 1 that are not explicitly specified in the source operands. Similarly, another of the two remaining data elements may store a second logical combination $W^*_{j-5}$. The logical combination $W^*_{j-5}$ may be defined by the following Equation 6:

$$W^*_{j-5} = (W_{j-12}<<<7) \text{XOR } W_{j-5} \quad \text{Equation 6.}$$

Notice that Equation 6 is based on the last part of Equation 5. $W_{j-12}$ and $W_{j-5}$ are two messages from Equation 5 that are not explicitly specified in the source operands. $W^*_{j-6}$ and $W^*_{j-5}$ may each be evaluated prior to the two message SM3 message expansion instruction and then stored in the source operands. In this example, six of the eight data elements from the two source operands may store a subset of six of the messages needed to evaluate Equations 1 and 5, whereas the remaining two data elements from the two source operands may each store a logical combination of two of the remaining data elements. The six messages $W_{j-16}$, $W_{j-9}$, $W_{j-3}$, $W_{j-15}$, $W_{j-8}$, and $W_{j-2}$, and the two logical combinations $W^*_{j-6}$ and $W^*_{j-5}$ collectively have information sufficient to evaluate Equations 1 and 5.

In the particular illustrated embodiment, the first source packed data operand may store $W^*_{j-6}$ in bits [31:0], $W^*_{j-5}$ in bits [63:32], $W_{j-16}$ in bits [95:64], and $W_{j-15}$ in bits [127:96], although this is not required. Likewise, in the particular illustrated embodiment, the second source packed data operand may store $W_{j-3}$ in bits [31:0], $W_{j-2}$ in bits [63:32], $W_{j-9}$ in bits [95:64], and $W_{j-8}$ in bits [127:96], although this is not required. The scope of the invention is not particularly limited to the particular arrangement of the messages and logical combinations in the source operands. As long as the needed messages and/or logical combinations are provided somewhere in the source operands, they may be routed or otherwise utilized by the circuitry or other logic used to perform the instruction (e.g., routed to the appropriate XOR and/or rotate logic). However, as will be explained further below, certain efficiencies and/or advantages may be achieved by certain arrangements of the messages within the source operands from an overall algorithmic perspective (e.g., based on needs to rearrange data around in operands during the various iterations, etc.).

As an example, in some cases it may be advantageous to store messages for adjacent rounds next to each other in the operands, or at least within the same operand. Each message in Equation 1 has a corresponding message in Equation 5 that is for one round later. In particular, messages $W_{j-16}$ and $W_{j-15}$, messages $W_{j-9}$ and $W_{j-8}$, and messages $W_{j-3}$ and $W_{j-2}$ are each pairs of messages from adjacent rounds. Within these pairs, $W_{j-16}$, $W_{j-9}$, and $W_{j-3}$ are each relatively older messages, whereas $W_{j-15}$, $W_{j-8}$, and $W_{j-2}$ are each relatively newer/younger messages. In the illustrated embodiment, $W_{j-16}$ and $W_{j-15}$ are stored in adjacent data element positions in the operands, messages $W_{j-9}$ and $W_{j-8}$ are stored in adjacent data element positions, and messages $W_{j-3}$ and $W_{j-2}$ are stored in adjacent data element positions. Keeping these messages from adjacent rounds adjacent to one another in the operands may help to simplify the algorithm, as will be apparent from the description further below. In addition, in the illustrated embodiment, the messages of each of the three pairs of messages from adjacent rounds are all stored in the same relative order (e.g., from older to newer/younger) with respect to bit positions in the operands. In this case, $W_{j-16}$ (the relatively older message) is at a less significant bit position than $W_{j-15}$ (the relatively younger message). This is also true for $W_{j-9}$ and $W_{j-8}$, and for $W_{j-3}$ and $W_{j-2}$. Notice this is also true for the generated messages $W_j$ and $W_{j+1}$. Again, this is not required, but may provide certain efficiencies and/or advantages from an overall algorithmic perspective.

Referring again to FIG. 4, the first and second source packed data operands may be provided to an SM3 message expansion execution logic or unit 416. A result packed data operand 424 may be generated and stored in a destination storage location in response to the instruction. The destination storage location may be specified or otherwise indicated by the instruction. In various embodiments, the destination storage location may be a packed data register, a memory location, or other storage location. In some embodiments, for this two message SM3 message expansion operation/instruction, the result packed data may include a $W_j$ message to be input to a round j of the compression function of the SM3 hash function, and a $W_{j+1}$ message to be input to a round j+1 of the compression function.

The generated message $W_j$ may be equal to an evaluation of, or result generated by evaluating, Equation 1 and Equation 2. The generated message $W_{j+1}$ may be equal to an evaluation of, or result generated by evaluating, Equation 5 and Equation 2. The new messages $W_j$ and $W_{j+1}$ represent two new messages generated within the confines of the execution of the two message SM3 message expansion operation/instruction. Except for operations to generate logical combinations (e.g., $W^*_{j-6}$ and $W^*_{j-5}$), substantially all other operations associated with evaluating Equations 1 and 2, and Equations 5 and 2, may be performed within the confines of the execution of the single instruction. Advantageously, this two message SM3 message expansion operation/instruction may significantly help to increase the speed, efficiency, and/or performance of implementing the SM3 message generation (e.g., by avoiding an otherwise high instruction count and complexity through conventional software approaches).

As shown, in some embodiments, the destination storage location used to store the result packed data 424 may optionally be a same storage location as used for one of the source packed data operands. For example, the instruction may have a source/destination operand that explicitly specified once but is implicitly used as both a source operand and then later as a destination operand. In this particular example, the storage location for the first packed data operand 420 has been reused for the result packed data 424, although this is not required. In some embodiments, messages $W_j$ and/or $W_{j+1}$ may be stored over one or more of the logical combinations. For example, as shown in the illustrated example, $W_{j+1}$ may be stored over $W^*_{j-5}$ and $W_j$ may be stored over $W^*_{j-6}$. This is not required, but may tend to provide certain efficiencies and/or advantages from an overall algorithmic perspective. For example, the $W^*_{j-5}$ and $W^*_{j-6}$ logical combinations may tend to be relatively less useful for generating other messages for subsequent rounds in the iterations than the other messages $W_{j-16}$, $W_{j-15}$, $W_{j-9}$, $W_{j-8}$, $W_{j-3}$, and $W_{j-2}$. Notice also that $W_j$ (the relatively older message) and $W_{j+1}$ (the relatively younger/newer message) may be stored in the same relative bit order as was used for some, most, or all of the other pairs of messages from adjacent rounds (e.g., the pair $W_{j-16}/W_{j-15}$, the pair $W_{j-9}/W_{j-8}$, and the pair $W_{j-3}/W_{j-2}$). Again, this is not required, but may provide certain efficiencies and/or advantages from an overall algorithmic perspective.

It is to be appreciated that these are just a few illustrative examples of suitable two message SM3 message generation instructions/operations. In other embodiments, a source need not be used as a destination. In other embodiments, a 256-bit source operand may optionally be used to provide all of the described data elements or some data elements along with others provided by a 128-bit operand. In still other embodiments, narrower operands may optionally be used (e.g., four 64-bit SIMD operands may optionally be used). In still other embodiments, other logical combinations besides $W^*_{j-6}$ and $W^*_{j-5}$ may optionally be provided.

One particular detailed working example of a suitable two message SM3 message generation instruction is an instruction SM3EXPAND. The SM3EXPAND instruction has the following format: SM3EXPAND XMM1, XMM2. XMM1 is an explicitly specified source/destination register that initially stores $W_{j-15}$ in [127:96], $W_{j-16}$ in [95:64], $W^*_{j-5}$ in [63:32], and $W^*_{j-6}$ in [31:0]. XMM2 is an explicitly specified source register that stores $W_{j-8}$ in [127:96], $W_{j-9}$ in [95:64], $W_{j-2}$ in [63:32], and $W_{j-3}$ in [31:0]. The SM3EXPAND instruction only indicates the operands XMM1 and XMM2. $W^*_{j-6}$ is equal to $(W_{j-13}<<<7)$ XOR $W_{j-6}$. $W^*_{j-5}$ is equal to $(W_{j-12}<<<7)$ XOR $W_{j-5}$. Performing the SM3EXPAND instruction stores a result packed data in the XMM1 register. A first new message $W_j$ is equal to $P1(W_{j-16}$ XOR $W_{j-9}$ XOR $(W_{j-3}<<<15))$ XOR $W^*_{j-6}$. The function $P1(X)$ is equal to X XOR $(X<<<15)$ XOR $(X<<<23)$. The new message $W_j$ is stored in bits [31:0] of XMM1 over $W^*_{j-6}$. A second new message $W_{j+1}$ is equal to $P1(W_{j-15}$ XOR $W_{j-8}$ XOR $(W_{j-2}<<<15))$ XOR $W^*_{j-5}$. The new message $W_{j+1}$ is stored in bits [63:32] of XMM1 over $W^*_{j-5}$.

Figure 5:
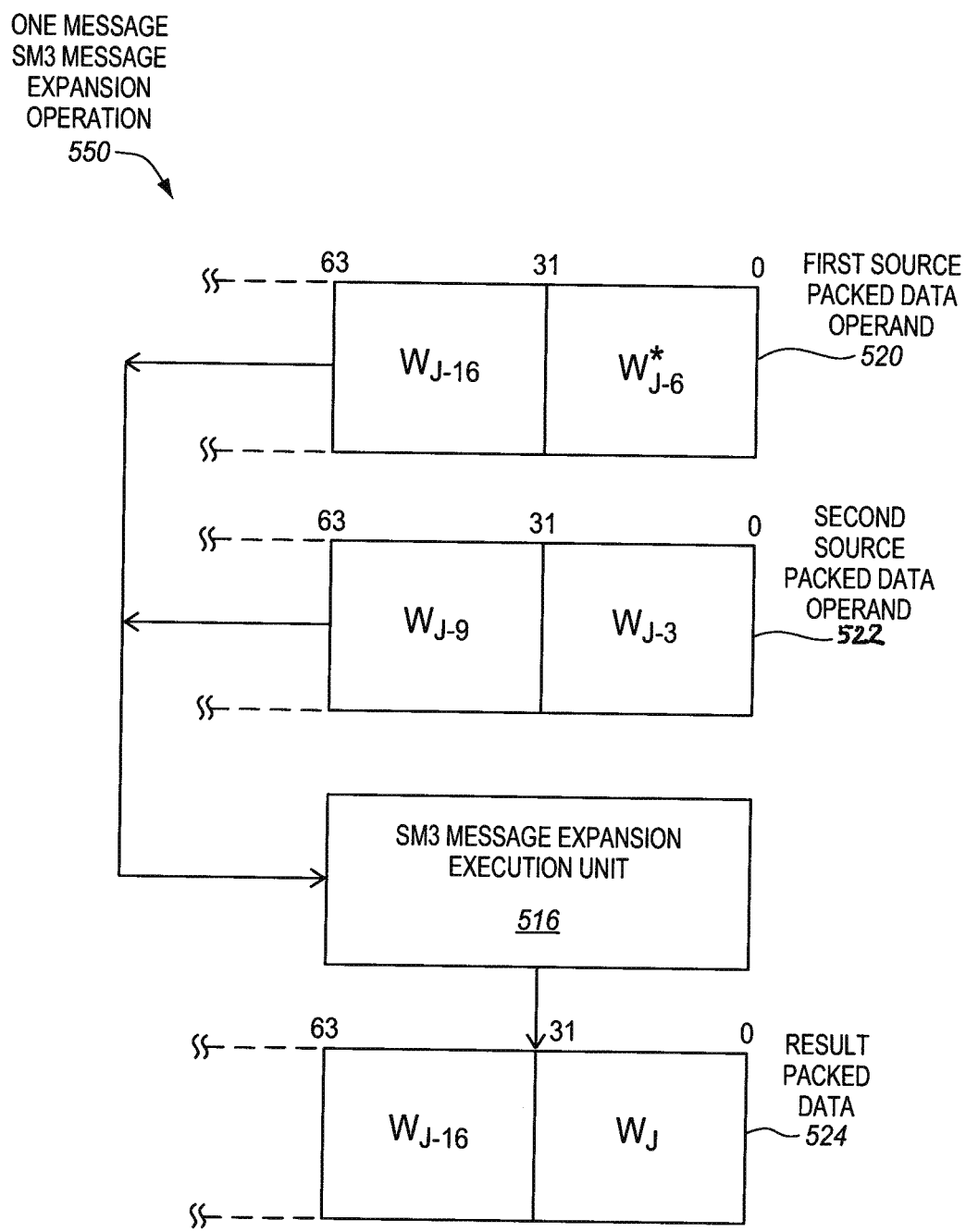
FIG. 5 is a block diagram of an embodiment of a one message SM3 message expansion operation.

FIG. 5 is a block diagram illustrating an embodiment of a one message SM3 message expansion operation 550 that may be performed in response to an embodiment of a one message SM3 message expansion instruction. The instruction may specify or otherwise indicate a first source packed data operand 520 and a second source packed data operand 522. These operands may be in registers, memory locations, or other storage locations. In the illustrated embodiment, each of the first and second source packed data operands is at least 64-bits wide and has two 32-bit data elements. Wider operands (e.g., 128-bit operands) may optionally be used, if desired. The first and second source packed data operands together provide at least four 32-bit data elements.

In some embodiments, the data elements of the first and second source packed data operands may collectively include information sufficient to evaluate Equation 1:

$$W_j = P1(W_{j-16} \text{ XOR } W_{j-9} \text{ XOR}(W_{j-3}<<<15))\text{XOR}$$

$$(W_{j-13}<<<7)\text{XOR } W_{j-6} \qquad \text{Equation 1}$$

where P1 is a permutation function defined by Equation 2:

$$P1(X)=X \text{ XOR}(X<<<15)\text{XOR}(X<<<23) \qquad \text{Equation 2}$$

Equation 1 includes five messages $W_{j-16}$, $W_{j-9}$, $W_{j-3}$, $W_{j-13}$, and $W_{j-6}$. In the particular illustrated embodiment, since the first and second source packed data operands only provide four data elements, all five messages needed to evaluate Equation 1 are not explicitly provided. Instead, in the illustrated embodiment, the first and second source packed data operands store three of the five messages needed to evaluate Equation 1, and store one data element providing a logical combination involving two messages. In the particular illustrated embodiment, the source packed data operands store the three messages $W_{j-16}$, $W_{j-9}$, $W_{j-3}$, and the logical combination $W^*_{j-6}$, which represents and/or is equal to $(W_{j-13}<<<7)$ XOR $W_{j-6}$. This represents sufficient information to evaluate Equations 1 and 2. In other embodiments, other logical combinations may optionally be used besides $W^*_{j-6}$.

In the particular illustrated embodiment, the first source packed data operand stores $W^*_{j-6}$ in bits [31:0] and stores $W_{j-16}$ in bits [63:32], although this is not required. Likewise, in the particular illustrated embodiment, the second source packed data operand stores $W_{j-3}$ in bits [31:0] and stores $W_{j-9}$ in bits [63:32], although this is not required. As before, the scope of the invention is not particularly limited to the particular arrangement of the messages and logical combinations in the source operands. In another embodiment, instead of using logical combination $W^*_{j-6}$, one of the source operands may optionally be wider than 64-bits (e.g., a 128-bit operand) to provide an additional data element so that all five messages needed to evaluate Equations 1 and 2 may be explicitly provided.

Referring again to FIG. 5, the first and second source packed data operands may be provided to an SM3 message expansion execution logic or unit 516. A result packed data operand 524 may be generated and stored in a destination storage location in response to the instruction. The destination storage location may be specified or otherwise indicated by the instruction. The destination storage location may be a packed data register, a memory location, or other storage location. In some embodiments, for this one message SM3 message expansion operation/instruction, the result packed data may include a $W_j$ message to be input to a round j of the compression function of the SM3 hash function. Except for operations to generate the logical combination (e.g., $W^*_{j-6}$), substantially all other operations associated with evaluating Equations 1 and 2 may be performed within the confines of the execution of the single instruction. As shown, in some embodiments, the destination storage location used to store the result packed data 524 may optionally be the same storage location as was used for one of the source packed data operands. For example, the instruction may implicitly indicate that a source operand is to be reused as a destination operand. In some embodiments, the message $W_j$ may be stored over a logical combination (e.g., $W^*_{j-6}$), although this is not required. In other embodiments, a source need not be used as a destination.

Figure 6:
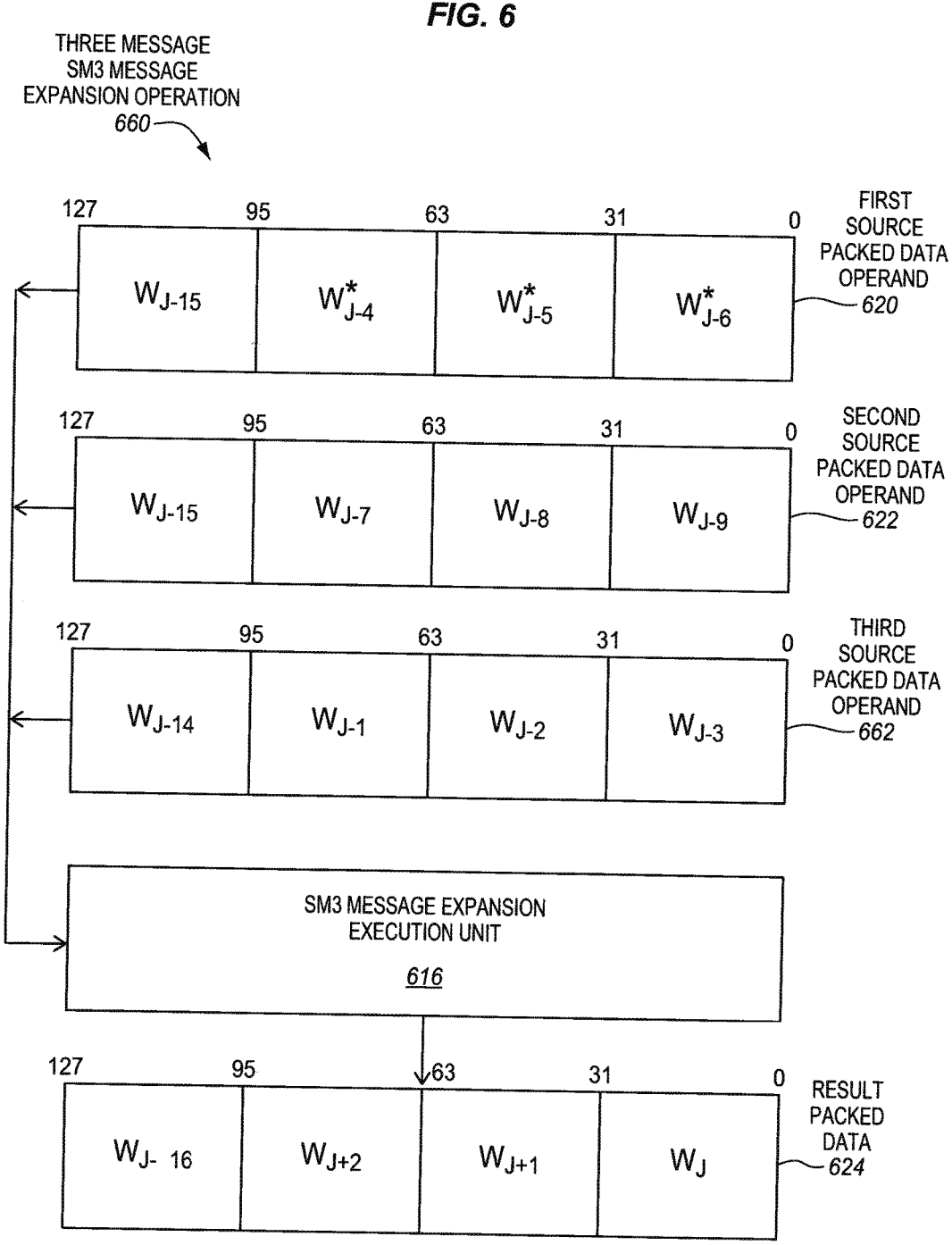
FIG. 6 is a block diagram of an embodiment of a three message SM3 message expansion operation.

FIG. 6 is a block diagram illustrating an embodiment of a three message SM3 message expansion operation 660 that may be performed in response to an embodiment of a one message SM3 message expansion instruction. The instruction may specify or otherwise indicate a first source packed data operand 620, a second source packed data operand 622, and a third source packed data operand 662. If the instruction format doesn't permit explicitly specifying three source packed data operands, one or more of them may be implicit to the instruction (e.g., implicit to the opcode). These operands may be in registers, memory locations, or other storage locations. In the illustrated embodiment, each of the first and second source packed data operands is at least 128-bits wide and has four 32-bit data elements. Wider operands (e.g., 256-bit operands) may optionally be used for one or more of these operands to provide the additional data elements in fewer than three sources, if desired. The source packed data operands together provide twelve 32-bit data elements.

In some embodiments, the data elements of the first, second, and third source packed data operands may collectively include information sufficient to evaluate Equation 1, Equation 5, and Equation 7:

$$W_j = P1(W_{j-16} \text{ XOR } W_{j-9} \text{ XOR}(W_{j-3} <<< 15)) \text{XOR}$$

$$(W_{j-13} <<< 7) \text{XOR } W_{j-6} \quad \text{Equation 1}$$

$$W_{j+1} = P1(W_{j-15} \text{ XOR } W_{j-8} \text{ XOR}(W_{j-2} <<< 15)) \text{XOR}$$

$$(W_{j-12} <<< 7) \text{XOR } W_{j-5} \quad \text{Equation 5}$$

$$W_{j+1} = P1(W_{j-14} \text{ XOR } W_{j-7} \text{ XOR}(W_{j-1} <<< 15)) \text{XOR}$$

$$(W_{j-11} <<< 7) \text{XOR } W_{j-4} \quad \text{Equation 7}$$

where P1 is a permutation function defined by Equation 2:

$$P1(X) = X \text{ XOR}(X <<< 15) \text{XOR}(X <<< 23) \quad \text{Equation 2}$$

Equations 1, 5, and 7 include fifteen different messages. In the particular illustrated embodiment, since the source packed data operands only provide twelve data elements, all fifteen messages needed to evaluate Equations 1, 5, and 7 are not explicitly provided. Instead, in the illustrated embodiment, the source packed data operands store nine of the fifteen messages needed to evaluate Equations 1, 5, and 7, and store three data elements each providing a logical combination of two messages. The logical combination $W^*_{j-6}$ represents and/or is equal to the value generated by Equation 4. The logical combination $W^*_{j-5}$ represents and/or is equal to the value generated by Equation 6. An additional logical combination, $W^*_{j-4}$, may be defined by the following Equation 8:

$$W^*_{j-4} = (W_{j-11} <<< 7) \text{XOR } W_{j-4} \quad \text{Equation 8}$$

Notice that Equation 8 is based on the last terms of Equation 7. In other embodiments, other logical combinations may optionally be used and/or a wider source operand may be used to explicitly provide additional messages. As before, the scope of the invention is not particularly limited to the particular arrangement of the messages and logical combinations in the source operands. Arrangements in which some or most of the messages from adjacent rounds are adjacent within the same operand may tend to offer certain efficiencies and/or advantages from an overall algorithmic perspective, but this is not required.

Referring again to FIG. 6, the first, second, and third source packed data operands may be provided to an SM3 message expansion execution logic or unit 616. A result packed data operand 624 may be generated and stored in a destination storage location in response to the instruction. The destination storage location may be a packed data register, a memory location, or other storage location. In some embodiments, for this three message SM3 message expansion operation/instruction, the result packed data may include a $W_j$ message, a $W_{j+1}$ message, and a $W_{j+2}$ message, respectively, to be input to a round j, a round j+1, and a round j+2 of the compression function of the SM3 hash function. Advantageously, this three message SM3 message expansion operation/instruction may significantly help to increase the speed, efficiency, and/or performance of implementing the SM3 message generation.

As shown, in some embodiments, the destination storage location used to store the result packed data 624 may optionally be the same storage location as was used for one of the source packed data operands. For example, the instruction may implicitly indicate that a source operand is to be reused as a destination operand. In some embodiments, one or more or all of $W_j$, $W_{j+1}$, and $W_{j+2}$ may optionally be stored over the logical combination(s) (e.g., $W^*_{j-6}$, $W^*_{j-5}$, $W^*_{j-4}$), although this is not required. In other embodiments, a source need not be used as a destination. In some embodiments, $W_j$, $W_{j+1}$, and $W_{j+2}$ may optionally be stored in a same order as some or most other pairs of adjacent messages in the operands, although this is not required.

The one message generation operation of FIG. 5 and a three message generation operation of FIG. 6 bear certain similarities to the two message generation operation of FIG. 4. To avoid obscuring the description, the different and/or additional characteristics for the one and three message generation operations have primarily been described, without repeating all the optionally similar or common characteristics and details relative to the two message generation operation of FIG. 4. However, it is to be appreciated that the previously described characteristics and details of the two message generation operation may also optionally apply to the one and three message generation operations, unless stated otherwise or otherwise clearly apparent.

Figure 7:
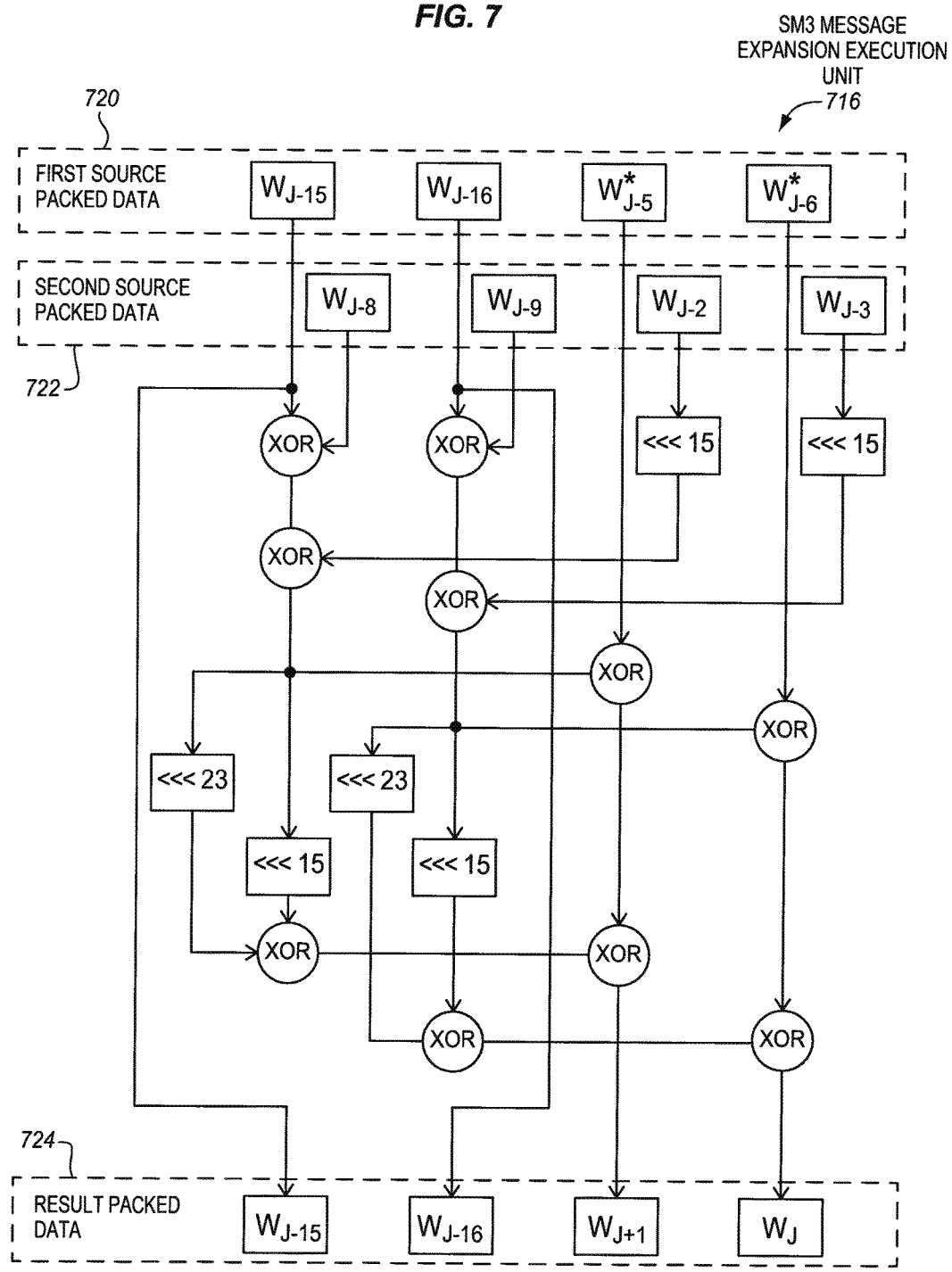
FIG. 7 is a block diagram of an example embodiment of a micro-architecture for an SM3 message expansion execution unit.

FIG. 7 is a block diagram of an example embodiment of a micro-architecture suitable for an SM3 message expansion execution unit 716. In this embodiment, the execution unit is operable to perform a two message SM3 message expansion instruction. The execution unit may receive a first source packed data 720 and a second source packed data 722. In this embodiment, the first and second source packed data have data elements that store messages and logical combinations similar to those shown and described for FIG. 4, although the scope of the invention is not so limited. The execution unit is also coupled to provide result packed data 724. The Execution logic includes XOR circuitry or other logic and rotation circuitry or other logic. The circuitry or logic is coupled together and coupled with the source packed data and the result packed data as shown by the arrows and lines in the illustration. The logic of the execution unit is operable to implement Equations 1 plus 2, and Equations 5 plus 2, except that the logical combinations for $W^*_{j-6}$ and $W^*_{j-5}$ are performed outside the execution unit in this example. In other embodiments, the logical combinations may instead optionally also be performed by the SM3 message expansion execution unit if the relevant messages are explicitly provided by the source operands. As can be readily seen in this figure, other arrangements of the data elements within the source packed data and/or result packed data may optionally be used with simple routing of the data elements.

Figure 8:
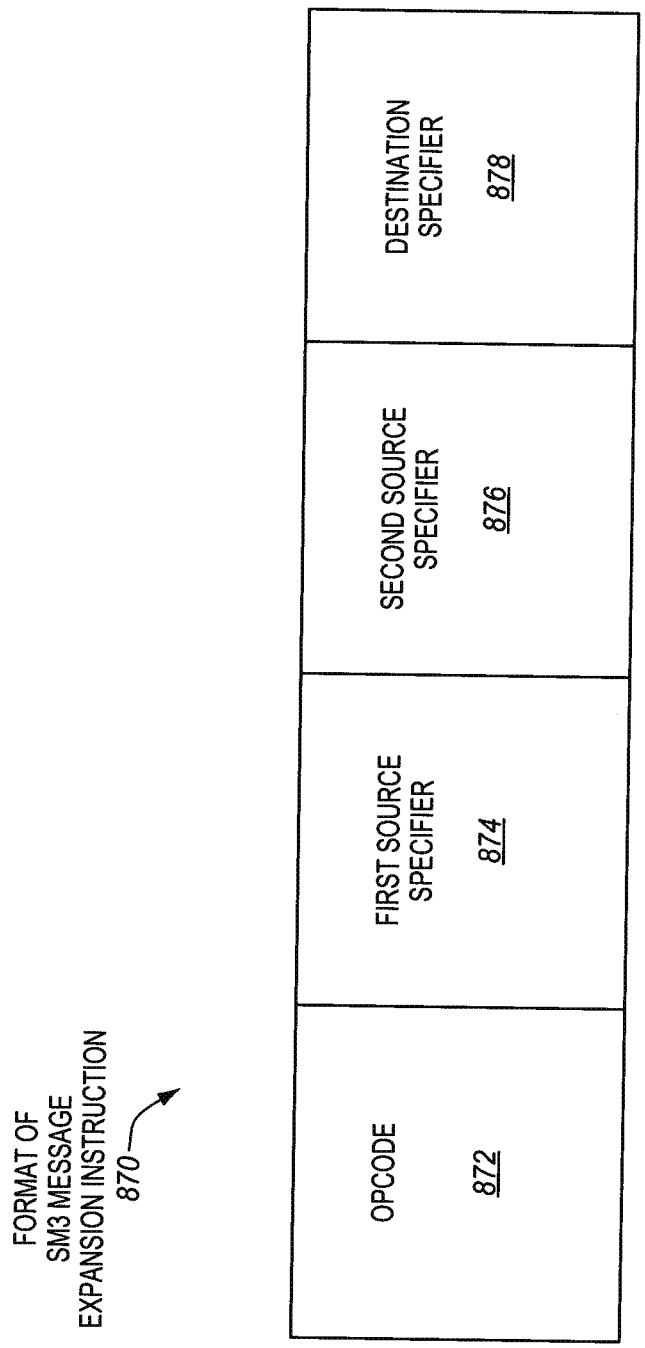
FIG. 8 is a block diagram of an example embodiment of a suitable instruction format for an SM3 message expansion instruction.

FIG. 8 is a block diagram of an embodiment of a suitable instruction format 870. The instruction format includes an operation code or opcode 872. The opcode may represent a plurality of bits or one or more fields that are operable to identify the instruction and/or the operation to be performed (e.g., an SM3 message expansion operation). The instruction format also optionally includes a first source specifier 874, a second source specifier 876, and a destination specifier 878. By way of example, each of these specifiers may include bits or one or more fields to specify an address of a register, memory location, or other storage location. Alternatively, in another embodiment, one or more of the first source specifier, the second source specifier, and the destination specifier (i.e., one of the explicit specifiers) may optionally be implicit to the instruction rather than being explicitly specified. For example, in some embodiments, instead of the destination specifier, a same storage location used for one of the sources may optionally be implicitly used as the destination. In this example, the instruction specifies only two sources, but in other embodiments a third source may also optionally be specified or indicated. It is to be appreciated that this is just one illustrative example. Alternate embodiments may add additional fields. In addition, the illustrated order/arrangement of the fields and is not required, but rather the fields may be rearranged, overlapped, fields need not include contiguous sequences of bits but rather may be composed of non-contiguous or separated bits, etc.

Figure 9:
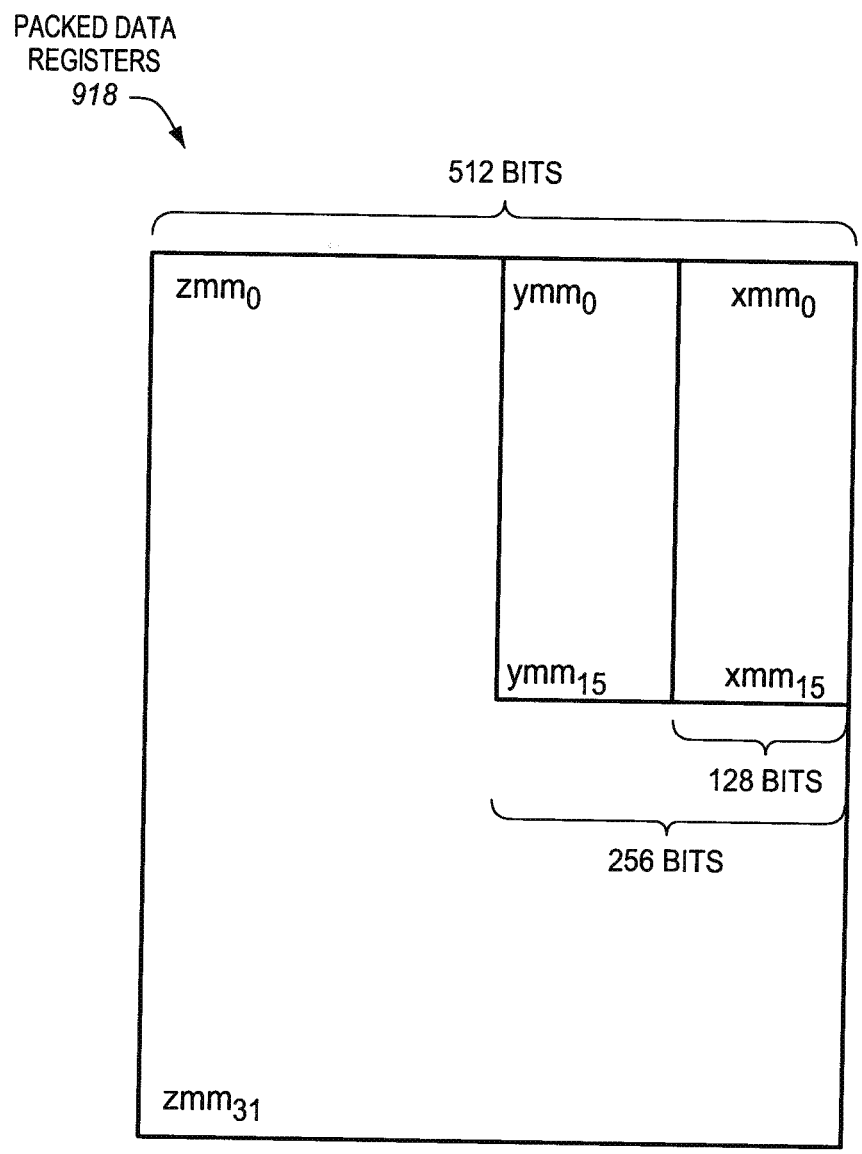
FIG. 9 is a diagram of an embodiment of suitable registers.

FIG. 9 is a block diagram of an example embodiment of a suitable set of packed data registers 918. The packed data registers include thirty-two 512-bit packed data registers labeled ZMM0 through ZMM31. In the illustrated embodiment, the lower order 256-bits of the lower sixteen registers, namely ZMM0-ZMM15, are aliased or overlaid on respective 256-bit packed data registers labeled YMM0-YMM15, although this is not required. Likewise, in the illustrated embodiment, the lower order 128-bits of the registers YMM0-YMM15 are aliased or overlaid on respective 128-bit packed data registers labeled XMM0-XMM15, although this also is not required. The 512-bit registers ZMM0 through ZMM31 are operable to hold 512-bit packed data, 256-bit packed data, or 128-bit packed data. The 256-bit registers YMM0-YMM15 are operable to hold 256-bit packed data or 128-bit packed data. The 128-bit registers XMM0-XMM15 are operable to hold 128-bit packed data. In some embodiments, each of the registers may be used to store either packed floating-point data or packed integer data. Different data element sizes are supported including at least 8-bit byte data, 16-bit word data, 32-bit doubleword, 32-bit single-precision floating point data, 64-bit quadword, and 64-bit double-precision floating point data. In alternate embodiments, different numbers of registers and/or different sizes of registers may be used. In still other embodiments, registers may or may not use aliasing of larger registers on smaller registers and/or may or may not be used to store floating point data.

To further illustrate certain concepts, consider how an SM3 message expansion instruction may be used in an overall message scheduling algorithm that organizes the messages appropriately in the source opernands and uses the SM3 message expansion instruction to generate new messages. In this case, we consider the particular embodiment of the SM3 message expansion instruction SM3EXPAND, which was described above, although the scope of the invention is not so limited. In this algorithm, the shuffle instruction VSHUFPS is used to place the terms in the proper word lanes of the XMM input registers for the SM3EXPAND instruction.

The initial sixteen $W_j$ message input may be stored in four XMM registers as follows:

XMM5: $W_{j-13}$, $W_{j-14}$, $W_{j-15}$, $W_{j-16}$
XMM6: $W_{j-9}$, $W_{j-10}$, $W_{j-11}$, $W_{j-12}$
XMM7: $W_{j-5}$, $W_{j-6}$, $W_{j-7}$, $W_{j-8}$
XMM8: $W_{j-1}$, $W_{j-2}$, $W_{j-3}$, $W_{j-4}$

In this example, the registers XMM1, XMM2, XMM3, and XMM4 are assumed to be free to be used in the following sequences to hold intermediate values. However, in other embodiments, other storage locations may be used instead. A four message extension scheduling instruction macro (Sched4) may be created. This macro may have the form:

Sched4(XMM8, XMM7, XMM6, XMM5).

An initial calculation to form $W^*_{j-3}$, $W^*_{j-4}$, $W^*_{j-5}$, $W^*_{j-6}$ in an XMM register may be performed to support four rounds of SM3 hash function message expansion utilizing two instances of the SM3EXPAND instruction. By way of example, this may be done using the following instruction sequence:

VMOV XMM3, XMM5; copy
VSHUF XMM3, XMM6; $W_{j-10}$, $W_{j-11}$, $W_{j-12}$, $W_{j-13}$ is stored in XMM3
VMOV XMM4, XMM3; copy
VSHL 7 XMM3
VSHR 25 XMM4; or could use VROT instead if desired
VMOV XMM2, XMM7
VSHUF XMM2, XMM8; $W_{j-3}$, $W_{j-4}$, $W_{j-5}$, $W_{j-6}$ is stored in XMM2
VXOR XMM3, XMM2
VXOR XMM3, XMM4; $W^*_{j-3}$, $W^*_{j-4}$, $W^*_{j-5}$, $W^*_{j-6}$ is stored in XMM3

After this sequence the four logical combinations $W^*_{j-3}$, $W^*_{j-4}$, $W^*_{j-5}$, $W^*_{j-6}$ are stored in XMM3. $W^*_{j-3}$ is equal to $(W_{j-10}<<<7)$ XOR $W_{j-3}$. $W^*_{j-4}$ is equal to $(W_{j-11}<<<7)$ XOR $W_{j-4}$. $W^*_{j-5}$ is equal to $(W_{j-12}<<<^7)$ XOR $W_{j-5}$. $W^*_{j-6}$ is equal to $(W_{j-13}<<<7)$ XOR $W_{j-6}$. The source registers for two rounds of SM3 message extension may also be formed. For example, this may be done using the following instruction sequence.

VMOV XMM1, XMM5
VSHUFPS XMM1, XMM3; $W_{j-15}$, $W_{j-16}$, $W^*_{j-5}$, $W^*_{j-6}$ is stored in XMM1
VMOV XMM2, XMM8
VSHUFPS XMM2, XMM7
VSHUFPS XMM2, XMM6 $W_{j-8}$, $W_{j-9}$, $W_{j-2}$, $W_{j-3}$ is stored in XMM2

Next, a first instance of the SM3EXPAND instruction may be used to generate two new messages $W_j$ and $W_{j+1}$:

SM3EXPAND XMM1, XMM2; $W_{j-15}$, $W_{j-16}$, $W_{j+1}$, $W_j$ are stored in XMM1.

The message indices for calculating the first pair of new message values may be decremented by two in order to continue calculation of the next pair of message values. The old output indices are as follows:

XMM5: $W_{j-13}$, $W_{j-14}$, $W_{j-15}$, $W_{j-16}$
XMM6: $W_{j-9}$, $W_{j-10}$, $W_{j-11}$, $W_{j-12}$
XMM7: $W_{j-5}$, $W_{j-6}$, $W_{j-7}$, $W_{j-8}$
XMM8: $W_{j-1}$, $W_{j-2}$, $W_{j-3}$, $W_{j-4}$
XMM1: $W_{j-15}$, $W_{j-16}$, $W_{j+1}$, $W_j$

VSHUFPS XMM5, XMM3; $W_{j-13}$, $W_{j-14}$, $W^*_{j-3}$, $W^*_{j-4}$ are stored in XMM5

VMOV XMM2, XMM7

VSHUFPS XMM2, XMM8

VSHUFPS XMM2, XMM1; $W_{j-6}$, $W_{j-7}$, $W_j$, $W_{j-1}$ are stored in XMM2

A second instance of the SM3EXPAND instruction may be used to generate two new messages $W_{j+3}$ and $W_{k+2}$.

SM3EXPAND XMM5, XMM2; $W_{j-13}$, $W_{j-14}$, $W_{j+3}$, $W_{j+2}$ is stored in XMM5

Next, a new XMM5 with the $W_{j-1}$, $W_{j-2}$, $W_{j-3}$, $W_{j-4}$ terms for calculating the next pair of message terms may be formed from XMM5 and XMM1.

VSHUFPS XMM5, XMM1

This completes the Sched4 macro. Notice that the message output for rounds 1-4 becomes the message input for rounds 5-8 as follows:

XMM5: $W_{j+3}$, $W_{j+2}$, $W_{j+1}$, $W_j$ $W_{j-1}$, $W_{j-2}$, $W_{j-3}$, $W_{j-4}$

XMM6: $W_{j-9}$, $W_{j-10}$, $W_{j-11}$, $W_{j-12}$ $W_{j-13}$, $W_{j-14}$, $W_{j-15}$, $W_{j-16}$

XMM7: $W_{j-5}$, $W_{j-6}$, $W_{j-7}$, $W_{j-8}$ $W_{j-9}$, $W_{j-10}$, $W_{j-11}$, $W_{j-12}$

XMM8: $W_{j-1}$, $W_{j-2}$, $W_{j-3}$, $W_{j-3}$, $W_{j-5}$, $W_{j-6}$, $W_{j-7}$, $W_{j-8}$

After the second execution of the SM3EXPAND instruction, four new message inputs have been developed. Message expansion continues with the $W_{j-1}$ to $W_{j-16}$ message inputs still in XMM5 to XMM8. Note that the XMM5 to XMM8 variables have undergone a cyclic shift by one compared to the original starting state. That is, the message words are in order XMM5, XMM8, XMM7, XMM6, whereas initially they were XMM8, XMM7, XMM6, XMM5. It is possible to unroll the loop by a factor of four to get back to the initial ordering.

In order to calculate the next sixteen messages, another four instances of the Sched4 macro may be performed as follows:

Sched4(XMM8, XMM7, XMM6, XMM5)
Sched4(XMM5, XMM8, XMM7, XMM6)
Sched4(XMM6, XMM5, XMM8, XMM7)
Sched4(XMM7, XMM6, XMM5, XMM8)

Now the state in XMM5 to XMM8 is the same as we started with sixteen new messages generated. Advantageously, this algorithm uses a relatively low number of XMM registers and a relatively low number of shuffle instructions and permits a tight loop (only 16 rounds need to be unrolled) for code size reduction. In some embodiments, the calculation of the $W_j$ messages for rounds 16 to 63 and the $W'_j$ messages for rounds 12 to 63 may be calculated before the evaluation of the compression function for a given round which uses those messages as inputs. In some embodiments, the $W_j$ and $W'_j$ messages may be calculated in parallel with the evaluation of the compression function for an earlier round so that the performance of implementing the SM3 hash function is not significantly limited by message expansion.

The descriptions here are intended to implement the SM3 hash function and obtain hash values that are consistent with the SM3 hash function as described in official publications (e.g., by the Chinese Commercial Cryptography Administration). Any possible discrepancies or inconsistencies herein (e.g., due to typographical errors or otherwise) that would lead to hashes different than those described by the standard are unintentional and erroneous. It is to be understood that the official standard in its correct form should be followed. In addition, while the current version of the SM3 hash function has been described, it is to be appreciated that embodiments are also applicable to extensions of this standard, derivations of this standard, modifications of this standard, related standards, and the like, which meet the limitations of the claims.

Components, features, and details described for any of FIGS. 1, 4-8, and 10 may also optionally be used in any of FIGS. 2-3. Moreover, components, features, and details described herein for any of the processors described herein may also optionally be used in and/or apply to any of the methods described herein, which in embodiments may be performed by and/or with such a processor and/or to any of the systems described herein, which in embodiments may include such a processor.

Exemplary Core Architectures, Processors, and Computer Architectures

Processor cores may be implemented in different ways, for different purposes, and in different processors. For instance, implementations of such cores may include: 1) a general purpose in-order core intended for general-purpose computing; 2) a high performance general purpose out-of-order core intended for general-purpose computing; 3) a special purpose core intended primarily for graphics and/or scientific (throughput) computing. Implementations of different processors may include: 1) a CPU including one or more general purpose in-order cores intended for general-purpose computing and/or one or more general purpose out-of-order cores intended for general-purpose computing; and 2) a coprocessor including one or more special purpose cores intended primarily for graphics and/or scientific (throughput). Such different processors lead to different computer system architectures, which may include: 1) the coprocessor on a separate chip from the CPU; 2) the coprocessor on a separate die in the same package as a CPU; 3) the coprocessor on the same die as a CPU (in which case, such a coprocessor is sometimes referred to as special purpose logic, such as integrated graphics and/or scientific (throughput) logic, or as special purpose cores); and 4) a system on a chip that may include on the same die the described CPU (sometimes referred to as the application core(s) or application processor(s)), the above described coprocessor, and additional functionality. Exemplary core architectures are described next, followed by descriptions of exemplary processors and computer architectures.

Exemplary Core Architectures

In-order and Out-of-order Core Block Diagram

FIG. 10A is a block diagram illustrating both an exemplary in-order pipeline and an exemplary register renaming, out-of-order issue/execution pipeline according to embodiments of the invention. FIG. 10B is a block diagram illustrating both an exemplary embodiment of an in-order architecture core and an exemplary register renaming, out-of-order issue/execution architecture core to be included in a processor according to embodiments of the invention. The solid lined boxes in FIGS. 10A-B illustrate the in-order pipeline and in-order core, while the optional addition of the dashed lined boxes illustrates the register renaming, out-of-order issue/execution pipeline and core. Given that the in-order aspect is a subset of the out-of-order aspect, the out-of-order aspect will be described.

In FIG. 10A, a processor pipeline 1000 includes a fetch stage 1002, a length decode stage 1004, a decode stage 1006, an allocation stage 1008, a renaming stage 1010, a scheduling (also known as a dispatch or issue) stage 1012, a register read/memory read stage 1014, an execute stage 1016, a write back/memory write stage 1018, an exception handling stage 1022, and a commit stage 1024.

FIG. 10B shows processor core 1090 including a front end unit 1030 coupled to an execution engine unit 1050, and both are coupled to a memory unit 1070. The core 1090 may be a reduced instruction set computing (RISC) core, a complex instruction set computing (CISC) core, a very long instruction word (VLIW) core, or a hybrid or alternative core type. As yet another option, the core 1090 may be a special-purpose core, such as, for example, a network or communication core, compression engine, coprocessor core, general purpose computing graphics processing unit (GPGPU) core, graphics core, or the like.

The front end unit 1030 includes a branch prediction unit 1032 coupled to an instruction cache unit 1034, which is coupled to an instruction translation lookaside buffer (TLB) 1036, which is coupled to an instruction fetch unit 1038, which is coupled to a decode unit 1040. The decode unit 1040 (or decoder) may decode instructions, and generate as an output one or more micro-operations, micro-code entry points, microinstructions, other instructions, or other control signals, which are decoded from, or which otherwise reflect, or are derived from, the original instructions. The decode unit 1040 may be implemented using various different mechanisms. Examples of suitable mechanisms include, but are not limited to, look-up tables, hardware implementations, programmable logic arrays (PLAs), microcode read only memories (ROMs), etc. In one embodiment, the core 1090 includes a microcode ROM or other medium that stores microcode for certain macroinstructions (e.g., in decode unit 1040 or otherwise within the front end unit 1030). The decode unit 1040 is coupled to a rename/allocator unit 1052 in the execution engine unit 1050.

The execution engine unit 1050 includes the rename/allocator unit 1052 coupled to a retirement unit 1054 and a set of one or more scheduler unit(s) 1056. The scheduler unit(s) 1056 represents any number of different schedulers, including reservations stations, central instruction window, etc. The scheduler unit(s) 1056 is coupled to the physical register file(s) unit(s) 1058. Each of the physical register file(s) units 1058 represents one or more physical register files, different ones of which store one or more different data types, such as scalar integer, scalar floating point, packed integer, packed floating point, vector integer, vector floating point status (e.g., an instruction pointer that is the address of the next instruction to be executed), etc. In one embodiment, the physical register file(s) unit 1058 comprises a vector registers unit, a write mask registers unit, and a scalar registers unit. These register units may provide architectural vector registers, vector mask registers, and general purpose registers. The physical register file(s) unit(s) 1058 is overlapped by the retirement unit 1054 to illustrate various ways in which register renaming and out-of-order execution may be implemented (e.g., using a reorder buffer(s) and a retirement register file(s); using a future file(s), a history buffer(s), and a retirement register file(s); using a register maps and a pool of registers; etc.). The retirement unit 1054 and the physical register file(s) unit(s) 1058 are coupled to the execution cluster(s) 1060. The execution cluster(s) 1060 includes a set of one or more execution units 1062 and a set of one or more memory access units 1064. The execution units 1062 may perform various operations (e.g., shifts, addition, subtraction, multiplication) and on various types of data (e.g., scalar floating point, packed integer, packed floating point, vector integer, vector floating point). While some embodiments may include a number of execution units dedicated to specific functions or sets of functions, other embodiments may include only one execution unit or multiple execution units that all perform all functions. The scheduler unit(s) 1056, physical register file(s) unit(s) 1058, and execution cluster(s) 1060 are shown as being possibly plural because certain embodiments create separate pipelines for certain types of data/operations (e.g., a scalar integer pipeline, a scalar floating point/packed integer/packed floating point/vector integer/vector floating point pipeline, and/or a memory access pipeline that each have their own scheduler unit, physical register file(s) unit, and/or execution cluster—and in the case of a separate memory access pipeline, certain embodiments are implemented in which only the execution cluster of this pipeline has the memory access unit(s) 1064). It should also be understood that where separate pipelines are used, one or more of these pipelines may be out-of-order issue/execution and the rest in-order.

The set of memory access units 1064 is coupled to the memory unit 1070, which includes a data TLB unit 1072 coupled to a data cache unit 1074 coupled to a level 2 (L2) cache unit 1076. In one exemplary embodiment, the memory access units 1064 may include a load unit, a store address unit, and a store data unit, each of which is coupled to the data TLB unit 1072 in the memory unit 1070. The instruction cache unit 1034 is further coupled to a level 2 (L2) cache unit 1076 in the memory unit 1070. The L2 cache unit 1076 is coupled to one or more other levels of cache and eventually to a main memory.

By way of example, the exemplary register renaming, out-of-order issue/execution core architecture may implement the pipeline 1000 as follows: 1) the instruction fetch 1038 performs the fetch and length decoding stages 1002 and 1004; 2) the decode unit 1040 performs the decode stage 1006; 3) the rename/allocator unit 1052 performs the allocation stage 1008 and renaming stage 1010; 4) the scheduler unit(s) 1056 performs the schedule stage 1012; 5) the physical register file(s) unit(s) 1058 and the memory unit 1070 perform the register read/memory read stage 1014; the execution cluster 1060 perform the execute stage 1016; 6) the memory unit 1070 and the physical register file(s) unit(s) 1058 perform the write back/memory write stage 1018; 7) various units may be involved in the exception handling stage 1022; and 8) the retirement unit 1054 and the physical register file(s) unit(s) 1058 perform the commit stage 1024.

The core 1090 may support one or more instructions sets (e.g., the x86 instruction set (with some extensions that have been added with newer versions); the MIPS instruction set of MIPS Technologies of Sunnyvale, Calif.; the ARM instruction set (with optional additional extensions such as NEON) of ARM Holdings of Sunnyvale, Calif.), including the instruction(s) described herein. In one embodiment, the core 1090 includes logic to support a packed data instruction set extension (e.g., AVX1, AVX2), thereby allowing the operations used by many multimedia applications to be performed using packed data.

It should be understood that the core may support multithreading (executing two or more parallel sets of operations or threads), and may do so in a variety of ways including time sliced multithreading, simultaneous multithreading (where a single physical core provides a logical core for each of the threads that physical core is simultaneously multithreading), or a combination thereof (e.g., time sliced fetching and decoding and simultaneous multithreading thereafter such as in the Intel® Hyperthreading technology).

While register renaming is described in the context of out-of-order execution, it should be understood that register renaming may be used in an in-order architecture. While the illustrated embodiment of the processor also includes separate instruction and data cache units 1034/1074 and a shared L2 cache unit 1076, alternative embodiments may have a single internal cache for both instructions and data, such as, for example, a Level 1 (L1) internal cache, or multiple levels of internal cache. In some embodiments, the system may include a combination of an internal cache and an external cache that is external to the core and/or the processor. Alternatively, all of the cache may be external to the core and/or the processor.

Specific Exemplary In-Order Core Architecture

FIGS. 11A-B illustrate a block diagram of a more specific exemplary in-order core architecture, which core would be one of several logic blocks (including other cores of the same type and/or different types) in a chip. The logic blocks communicate through a high-bandwidth interconnect network (e.g., a ring network) with some fixed function logic, memory I/O interfaces, and other necessary I/O logic, depending on the application.

FIG. 11A is a block diagram of a single processor core, along with its connection to the on-die interconnect network 1102 and with its local subset of the Level 2 (L2) cache 1104, according to embodiments of the invention. In one embodiment, an instruction decoder 1100 supports the x86 instruction set with a packed data instruction set extension. An L1 cache 1106 allows low-latency accesses to cache memory into the scalar and vector units. While in one embodiment (to simplify the design), a scalar unit 1108 and a vector unit 1110 use separate register sets (respectively, scalar registers 1112 and vector registers 1114) and data transferred between them is written to memory and then read back in from a level 1 (L1) cache 1106, alternative embodiments of the invention may use a different approach (e.g., use a single register set or include a communication path that allow data to be transferred between the two register files without being written and read back).

The local subset of the L2 cache 1104 is part of a global L2 cache that is divided into separate local subsets, one per processor core. Each processor core has a direct access path to its own local subset of the L2 cache 1104. Data read by a processor core is stored in its L2 cache subset 1104 and can be accessed quickly, in parallel with other processor cores accessing their own local L2 cache subsets. Data written by a processor core is stored in its own L2 cache subset 1104 and is flushed from other subsets, if necessary. The ring network ensures coherency for shared data. The ring network is bi-directional to allow agents such as processor cores, L2 caches and other logic blocks to communicate with each other within the chip. Each ring data-path is 1012-bits wide per direction.

FIG. 11B is an expanded view of part of the processor core in FIG. 11A according to embodiments of the invention. FIG. 11B includes an L1 data cache 1106A part of the L1 cache 1104, as well as more detail regarding the vector unit 1110 and the vector registers 1114. Specifically, the vector unit 1110 is a 16-wide vector processing unit (VPU) (see the 16-wide ALU 1128), which executes one or more of integer, single-precision float, and double-precision float instructions. The VPU supports swizzling the register inputs with swizzle unit 1120, numeric conversion with numeric convert units 1122A-B, and replication with replication unit 1124 on the memory input. Write mask registers 1126 allow predicating resulting vector writes.

Processor with Integrated Memory Controller and Graphics

Figure 12:
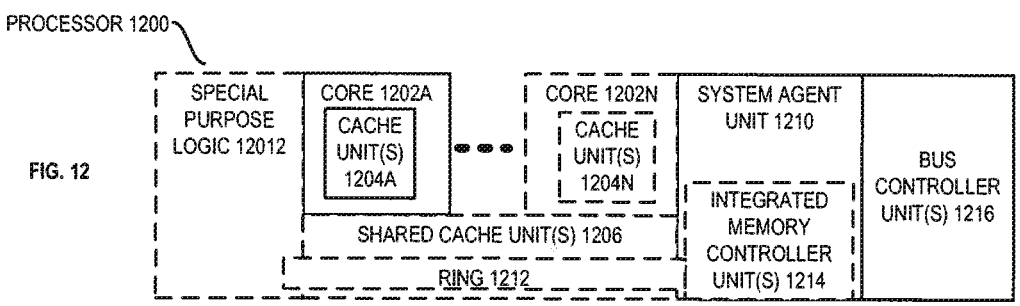
FIG. 12 is a block diagram of a processor that may have more than one core, may have an integrated memory controller, and may have integrated graphics according to embodiments of the invention.

FIG. 12 is a block diagram of a processor 1200 that may have more than one core, may have an integrated memory controller, and may have integrated graphics according to embodiments of the invention. The solid lined boxes in FIG. 12 illustrate a processor 1200 with a single core 1202A, a system agent 1210, a set of one or more bus controller units 1216, while the optional addition of the dashed lined boxes illustrates an alternative processor 1200 with multiple cores 1202A-N, a set of one or more integrated memory controller unit(s) 1214 in the system agent unit 1210, and special purpose logic 1208.

Thus, different implementations of the processor 1200 may include: 1) a CPU with the special purpose logic 1208 being integrated graphics and/or scientific (throughput) logic (which may include one or more cores), and the cores 1202A-N being one or more general purpose cores (e.g., general purpose in-order cores, general purpose out-of-order cores, a combination of the two); 2) a coprocessor with the cores 1202A-N being a large number of special purpose cores intended primarily for graphics and/or scientific (throughput); and 3) a coprocessor with the cores 1202A-N being a large number of general purpose in-order cores. Thus, the processor 1200 may be a general-purpose processor, coprocessor or special-purpose processor, such as, for example, a network or communication processor, compression engine, graphics processor, GPGPU (general purpose graphics processing unit), a high-throughput many integrated core (MIC) coprocessor (including 30 or more cores), embedded processor, or the like. The processor may be implemented on one or more chips. The processor 1200 may be a part of and/or may be implemented on one or more substrates using any of a number of process technologies, such as, for example, BiCMOS, CMOS, or NMOS.

The memory hierarchy includes one or more levels of cache within the cores, a set or one or more shared cache units 1206, and external memory (not shown) coupled to the set of integrated memory controller units 1214. The set of shared cache units 1206 may include one or more mid-level caches, such as level 2 (L2), level 3 (L3), level 4 (L4), or other levels of cache, a last level cache (LLC), and/or combinations thereof. While in one embodiment a ring based interconnect unit 1212 interconnects the integrated graphics logic 1208, the set of shared cache units 1206, and the system agent unit 1210/integrated memory controller unit(s) 1214, alternative embodiments may use any number of well-known techniques for interconnecting such units. In one embodiment, coherency is maintained between one or more cache units 1206 and cores 1202-A-N.

In some embodiments, one or more of the cores 1202A-N are capable of multi-threading. The system agent 1210 includes those components coordinating and operating cores 1202A-N. The system agent unit 1210 may include for example a power control unit (PCU) and a display unit. The PCU may be or include logic and components needed for regulating the power state of the cores 1202A-N and the integrated graphics logic 1208. The display unit is for driving one or more externally connected displays.

The cores 1202A-N may be homogenous or heterogeneous in terms of architecture instruction set; that is, two or more of the cores 1202A-N may be capable of execution the same instruction set, while others may be capable of executing only a subset of that instruction set or a different instruction set.

Exemplary Computer Architectures

FIGS. 13-16 are block diagrams of exemplary computer architectures.

Other system designs and configurations known in the arts for laptops, desktops, handheld PCs, personal digital assistants, engineering workstations, servers, network devices, network hubs, switches, embedded processors, digital signal processors (DSPs), graphics devices, video game devices, set-top boxes, micro controllers, cell phones, portable media players, hand held devices, and various other electronic devices, are also suitable. In general, a huge variety of systems or electronic devices capable of incorporating a processor and/or other execution logic as disclosed herein are generally suitable.

Figure 13:
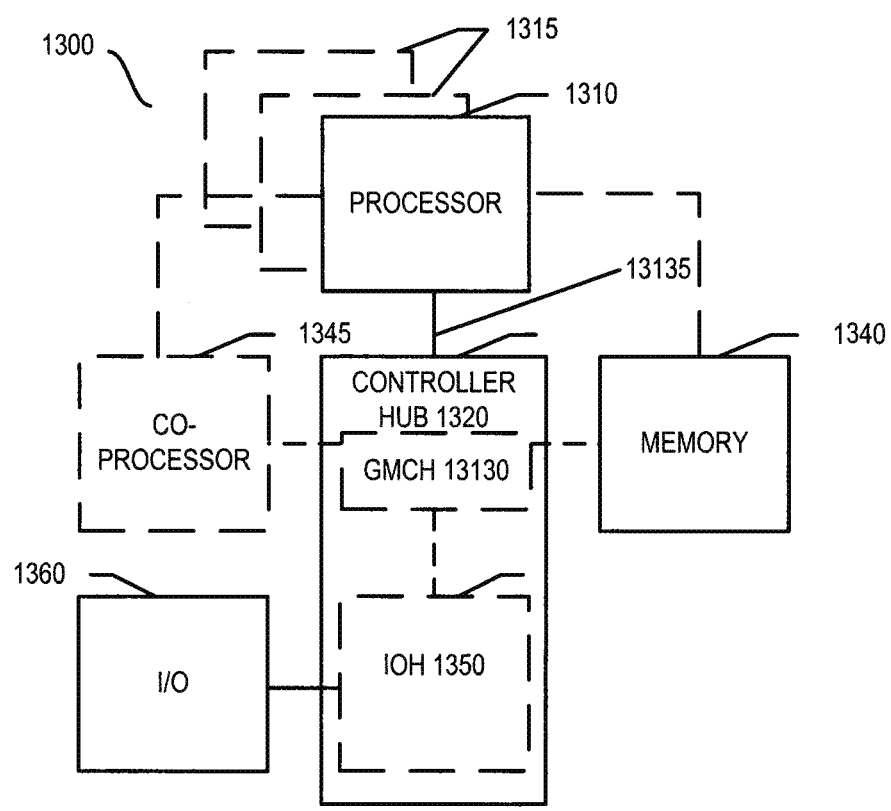
FIG. 13 shown is a block diagram of a system in accordance with one embodiment of the present invention.

Referring now to FIG. 13, shown is a block diagram of a system 1300 in accordance with one embodiment of the present invention. The system 1300 may include one or more processors 1310, 1315, which are coupled to a controller hub 1320. In one embodiment the controller hub 1320 includes a graphics memory controller hub (GMCH) 1390 and an Input/Output Hub (IOH) 1350 (which may be on separate chips); the GMCH 1390 includes memory and graphics controllers to which are coupled memory 1340 and a coprocessor 1345; the IOH 1350 is couples input/output (I/O) devices 1360 to the GMCH 1390. Alternatively, one or both of the memory and graphics controllers are integrated within the processor (as described herein), the memory 1340 and the coprocessor 1345 are coupled directly to the processor 1310, and the controller hub 1320 in a single chip with the IOH 1350.

The optional nature of additional processors 1315 is denoted in FIG. 13 with broken lines. Each processor 1310, 1315 may include one or more of the processing cores described herein and may be some version of the processor 1200.

The memory 1340 may be, for example, dynamic random access memory (DRAM), phase change memory (PCM), or a combination of the two. For at least one embodiment, the controller hub 1320 communicates with the processor(s) 1310, 1315 via a multi-drop bus, such as a frontside bus (FSB), point-to-point interface such as QuickPath Interconnect (QPI), or similar connection 1395.

In one embodiment, the coprocessor 1345 is a special-purpose processor, such as, for example, a high-throughput MIC processor, a network or communication processor, compression engine, graphics processor, GPGPU, embedded processor, or the like. In one embodiment, controller hub 1320 may include an integrated graphics accelerator.

There can be a variety of differences between the physical resources 1310, 1315 in terms of a spectrum of metrics of merit including architectural, microarchitectural, thermal, power consumption characteristics, and the like.

In one embodiment, the processor 1310 executes instructions that control data processing operations of a general type. Embedded within the instructions may be coprocessor instructions. The processor 1310 recognizes these coprocessor instructions as being of a type that should be executed by the attached coprocessor 1345. Accordingly, the processor 1310 issues these coprocessor instructions (or control signals representing coprocessor instructions) on a coprocessor bus or other interconnect, to coprocessor 1345. Coprocessor (s) 1345 accept and execute the received coprocessor instructions.

Figure 14:
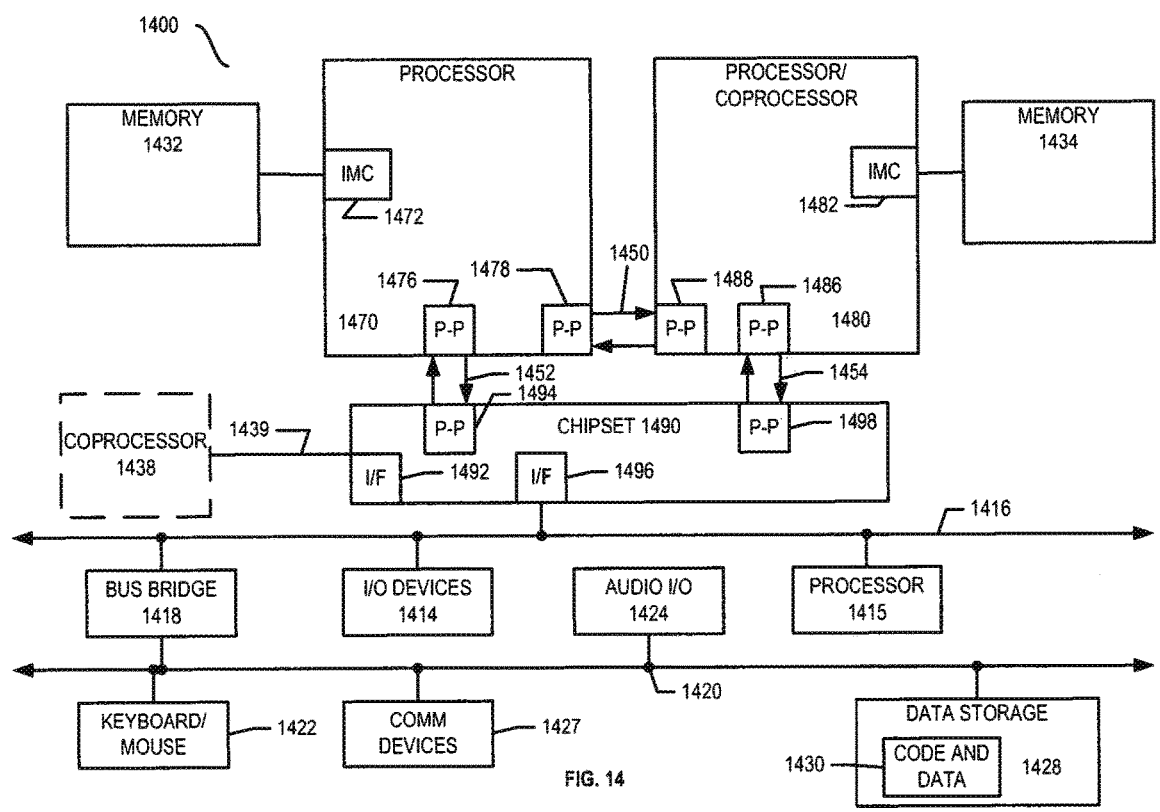
FIG. 14 shown is a block diagram of a first more specific exemplary system in accordance with an embodiment of the present invention.

Referring now to FIG. 14, shown is a block diagram of a first more specific exemplary system 1400 in accordance with an embodiment of the present invention. As shown in FIG. 14, multiprocessor system 1400 is a point-to-point interconnect system, and includes a first processor 1470 and a second processor 1480 coupled via a point-to-point interconnect 1450. Each of processors 1470 and 1480 may be some version of the processor 1200. In one embodiment of the invention, processors 1470 and 1480 are respectively processors 1310 and 1315, while coprocessor 1438 is coprocessor 1345. In another embodiment, processors 1470 and 1480 are respectively processor 1310 coprocessor 1345.

Processors 1470 and 1480 are shown including integrated memory controller (IMC) units 1472 and 1482, respectively. Processor 1470 also includes as part of its bus controller units point-to-point (P-P) interfaces 1476 and 1478; similarly, second processor 1480 includes P-P interfaces 1486 and 1488. Processors 1470, 1480 may exchange information via a point-to-point (P-P) interface 1450 using P-P interface circuits 1478, 1488. As shown in FIG. 14, IMCs 1472 and 1482 couple the processors to respective memories, namely a memory 1432 and a memory 1434, which may be portions of main memory locally attached to the respective processors.

Processors 1470, 1480 may each exchange information with a chipset 1490 via individual P-P interfaces 1452, 1454 using point to point interface circuits 1476, 1494, 1486, 1498. Chipset 1490 may optionally exchange information with the coprocessor 1438 via a high-performance interface 1439. In one embodiment, the coprocessor 1438 is a special-purpose processor, such as, for example, a high-throughput MIC processor, a network or communication processor, compression engine, graphics processor, GPGPU, embedded processor, or the like.

A shared cache (not shown) may be included in either processor or outside of both processors, yet connected with the processors via P-P interconnect, such that either or both processors' local cache information may be stored in the shared cache if a processor is placed into a low power mode.

Chipset 1490 may be coupled to a first bus 1416 via an interface 1496. In one embodiment, first bus 1416 may be a Peripheral Component Interconnect (PCI) bus, or a bus such as a PCI Express bus or another third generation I/O interconnect bus, although the scope of the present invention is not so limited.

As shown in FIG. 14, various I/O devices 1414 may be coupled to first bus 1416, along with a bus bridge 1418 which couples first bus 1416 to a second bus 1420. In one embodiment, one or more additional processor(s) 1415, such as coprocessors, high-throughput MIC processors, GPGPU's, accelerators (such as, e.g., graphics accelerators or digital signal processing (DSP) units), field programmable gate arrays, or any other processor, are coupled to first bus 1416. In one embodiment, second bus 1420 may be a low pin count (LPC) bus. Various devices may be coupled to a second bus 1420 including, for example, a keyboard and/or mouse 1422, communication devices 1427 and a storage unit 1428 such as a disk drive or other mass storage device which may include instructions/code and data 1430, in one embodiment. Further, an audio I/O 1424 may be coupled to the second bus 1420. Note that other architectures are possible. For example, instead of the point-to-point architecture of FIG. 14, a system may implement a multi-drop bus or other such architecture.

Figure 15:
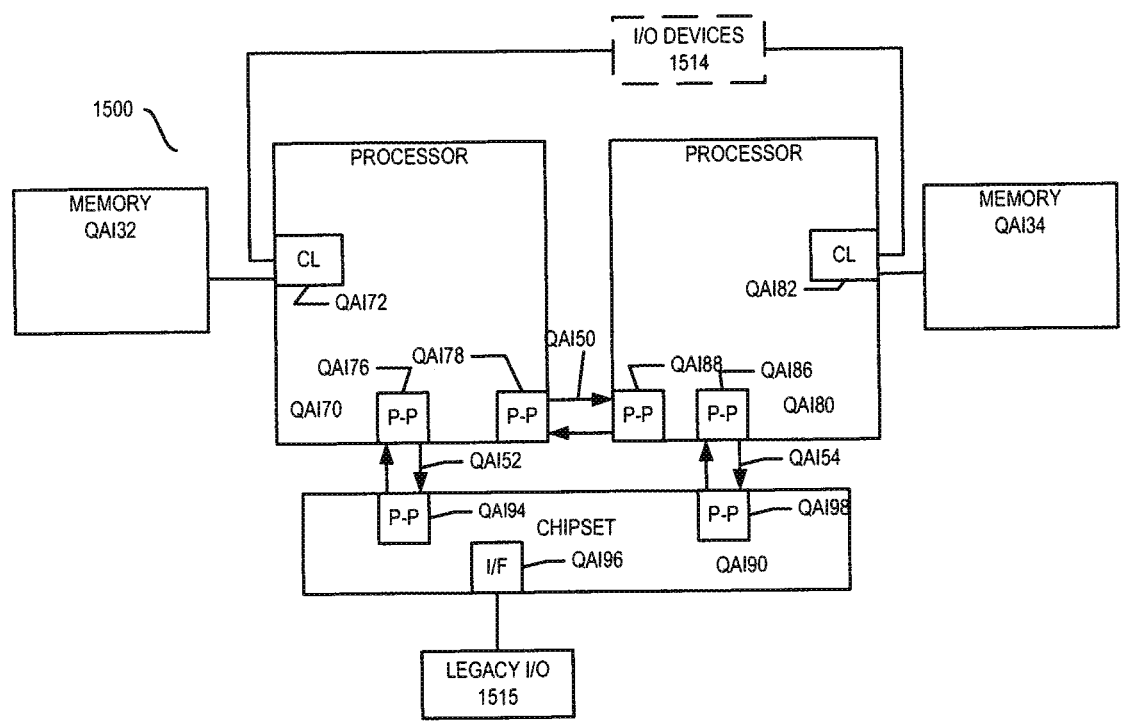
FIG. 15 shown is a block diagram of a second more specific exemplary system in accordance with an embodiment of the present invention.

Referring now to FIG. 15, shown is a block diagram of a second more specific exemplary system 1500 in accordance with an embodiment of the present invention Like elements in FIGS. 14 and 15 bear like reference numerals, and certain aspects of FIG. 14 have been omitted from FIG. 15 in order to avoid obscuring other aspects of FIG. 15.

FIG. 15 illustrates that the processors 1470, 1480 may include integrated memory and I/O control logic ("CL") 1472 and 1482, respectively. Thus, the CL 1472, 1482 include integrated memory controller units and include I/O control logic. FIG. 15 illustrates that not only are the memories 1432, 1434 coupled to the CL 1472, 1482, but also that I/O devices 1514 are also coupled to the control logic 1472, 1482. Legacy I/O devices 1515 are coupled to the chipset 1490.

Figure 16:
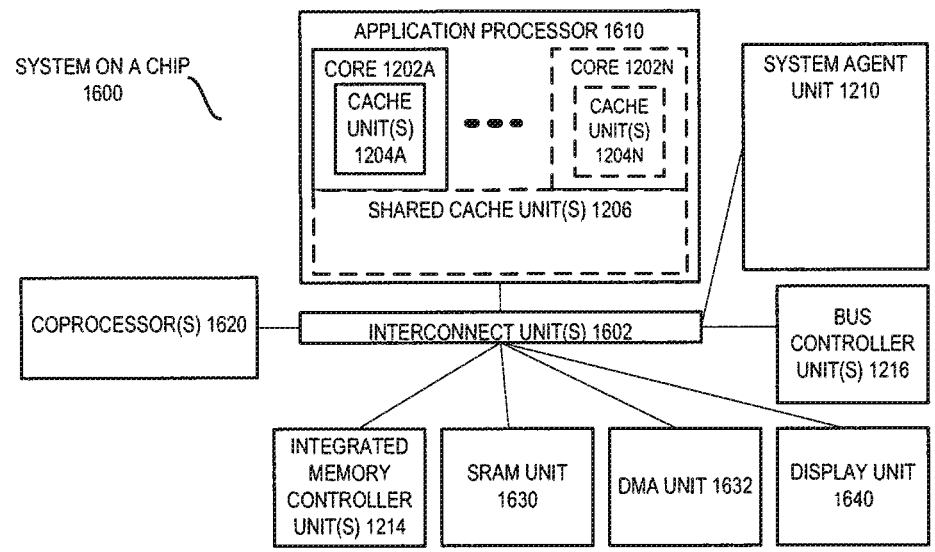
FIG. 16, shown is a block diagram of a SoC in accordance with an embodiment of the present invention.

Referring now to FIG. 16, shown is a block diagram of a SoC 1600 in accordance with an embodiment of the present invention. Similar elements in FIG. 12 bear like reference numerals. Also, dashed lined boxes are optional features on more advanced SoCs. In FIG. 16, an interconnect unit(s) 1602 is coupled to: an application processor 1610 which includes a set of one or more cores 202A-N and shared cache unit(s) 1206; a system agent unit 1210; a bus controller unit(s) 1216; an integrated memory controller unit(s) 1214; a set or one or more coprocessors 1620 which may include integrated graphics logic, an image processor, an audio processor, and a video processor; an static random access memory (SRAM) unit 1630; a direct memory access (DMA) unit 1632; and a display unit 1640 for coupling to one or more external displays. In one embodiment, the coprocessor (s) 1620 include a special-purpose processor, such as, for example, a network or communication processor, compression engine, GPGPU, a high-throughput MIC processor, embedded processor, or the like.

Embodiments of the mechanisms disclosed herein may be implemented in hardware, software, firmware, or a combination of such implementation approaches. Embodiments of the invention may be implemented as computer programs or program code executing on programmable systems comprising at least one processor, a storage system (including volatile and non-volatile memory and/or storage elements), at least one input device, and at least one output device.

Program code, such as code 1430 illustrated in FIG. 14, may be applied to input instructions to perform the functions described herein and generate output information. The output information may be applied to one or more output devices, in known fashion. For purposes of this application, a processing system includes any system that has a processor, such as, for example; a digital signal processor (DSP), a microcontroller, an application specific integrated circuit (ASIC), or a microprocessor.

The program code may be implemented in a high level procedural or object oriented programming language to communicate with a processing system. The program code may also be implemented in assembly or machine language, if desired. In fact, the mechanisms described herein are not limited in scope to any particular programming language. In any case, the language may be a compiled or interpreted language.

One or more aspects of at least one embodiment may be implemented by representative instructions stored on a machine-readable medium which represents various logic within the processor, which when read by a machine causes the machine to fabricate logic to perform the techniques described herein. Such representations, known as "IP cores" may be stored on a tangible, machine readable medium and supplied to various customers or manufacturing facilities to load into the fabrication machines that actually make the logic or processor.

Such machine-readable storage media may include, without limitation, non-transitory, tangible arrangements of articles manufactured or formed by a machine or device, including storage media such as hard disks, any other type of disk including floppy disks, optical disks, compact disk read-only memories (CD-ROMs), compact disk rewritable's (CD-RWs), and magneto-optical disks, semiconductor devices such as read-only memories (ROMs), random access memories (RAMs) such as dynamic random access memories (DRAMs), static random access memories (SRAMs), erasable programmable read-only memories (EPROMs), flash memories, electrically erasable programmable read-only memories (EEPROMs), phase change memory (PCM), magnetic or optical cards, or any other type of media suitable for storing electronic instructions.

Accordingly, embodiments of the invention also include non-transitory, tangible machine-readable media containing instructions or containing design data, such as Hardware Description Language (HDL), which defines structures, circuits, apparatuses, processors and/or system features described herein. Such embodiments may also be referred to as program products.

Emulation (Including Binary Translation, Code Morphing, Etc.)

In some cases, an instruction converter may be used to convert an instruction from a source instruction set to a target instruction set. For example, the instruction converter may translate (e.g., using static binary translation, dynamic binary translation including dynamic compilation), morph, emulate, or otherwise convert an instruction to one or more other instructions to be processed by the core. The instruction converter may be implemented in software, hardware, firmware, or a combination thereof. The instruction converter may be on processor, off processor, or part on and part off processor.

Figure 17:
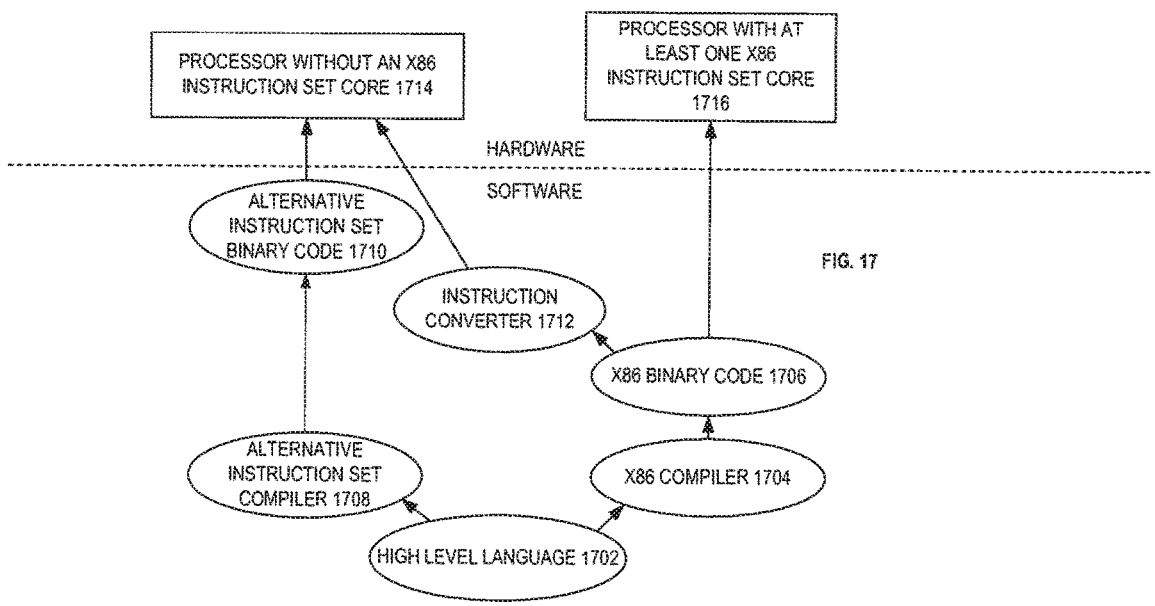
FIG. 17 is a block diagram contrasting the use of a software instruction converter to convert binary instructions in a source instruction set to binary instructions in a target instruction set according to embodiments of the invention.

FIG. 17 is a block diagram contrasting the use of a software instruction converter to convert binary instructions in a source instruction set to binary instructions in a target instruction set according to embodiments of the invention. In the illustrated embodiment, the instruction converter is a software instruction converter, although alternatively the instruction converter may be implemented in software, firmware, hardware, or various combinations thereof. FIG. 17 shows a program in a high level language 1702 may be compiled using an x86 compiler 1704 to generate x86 binary code 1706 that may be natively executed by a processor with at least one x86 instruction set core 1716. The processor with at least one x86 instruction set core 1716 represents any processor that can perform substantially the same functions as an Intel processor with at least one x86 instruction set core by compatibly executing or otherwise processing (1) a substantial portion of the instruction set of the Intel x86 instruction set core or (2) object code versions of applications or other software targeted to run on an Intel processor with at least one x86 instruction set core, in order to achieve substantially the same result as an Intel processor with at least one x86 instruction set core. The x86 compiler 1704 represents a compiler that is operable to generate x86 binary code 1706 (e.g., object code) that can, with or without additional linkage processing, be executed on the processor with at least one x86 instruction set core 1716. Similarly, FIG. 17 shows the program in the high level language 1702 may be compiled using an alternative instruction set compiler 1708 to generate alternative instruction set binary code 1710 that may be natively executed by a processor without at least one x86 instruction set core 1714 (e.g., a processor with cores that execute the MIPS instruction set of MIPS Technologies of Sunnyvale, Calif. and/or that execute the ARM instruction set of ARM Holdings of Sunnyvale, Calif.). The instruction converter 1712 is used to convert the x86 binary code 1706 into code that may be natively executed by the processor without an x86 instruction set core 1714. This converted code is not likely to be the same as the alternative instruction set binary code 1710 because an instruction converter capable of this is difficult to make; however, the converted code will accomplish the general operation and be made up of instructions from the alternative instruction set. Thus, the instruction converter 1712 represents software, firmware, hardware, or a combination thereof that, through emulation, simulation or any other process, allows a processor or other electronic device that does not have an x86 instruction set processor or core to execute the x86 binary code 1706.

In the description and claims, the terms "coupled" and/or "connected," along with their derivatives, may have be used. These terms are not intended as synonyms for each other. Rather, in embodiments, "connected" may be used to indicate that two or more elements are in direct physical and/or electrical contact with each other. "Coupled" may mean that two or more elements are in direct physical and/or electrical contact with each other. However, "coupled" may also mean that two or more elements are not in direct contact with each other, but yet still co-operate or interact with each other. For example, an execution unit may be coupled with a register and/or a decode unit through one or more intervening components. In the figures, arrows are used to show connections and couplings.

In the description and/or claims, the terms "logic," "unit," "module," or "component," may have been used. Each of these terms may be used to refer to hardware, firmware, software, or various combinations thereof. In example embodiments, each of these terms may refer to integrated circuitry, application specific integrated circuits, analog circuits, digital circuits, programmed logic devices, memory devices including instructions, and the like, and various combinations thereof. In some embodiments, these may include at least some hardware (e.g., transistors, gates, other circuitry components, etc.).

The term "and/or" may have been used. As used herein, the term "and/or" means one or the other or both (e.g., A and/or B means A or B or both A and B).

In the description above, specific details have been set forth in order to provide a thorough understanding of the embodiments. However, other embodiments may be practiced without some of these specific details. The scope of the invention is not to be determined by the specific examples provided above, but only by the claims below. In other instances, well-known circuits, structures, devices, and operations have been shown in block diagram form and/or without detail in order to avoid obscuring the understanding of the description. Where considered appropriate, reference numerals, or terminal portions of reference numerals, have been repeated among the figures to indicate corresponding or analogous elements, which may optionally have similar or the same characteristics, unless specified or clearly apparent otherwise. In some cases, where multiple components have been shown and described, they may instead optionally be integrated together as a single component. In other cases, where a single component has been shown and described, it may optionally be separated into two or more components.

Certain operations may be performed by hardware components, or may be embodied in machine-executable or circuit-executable instructions, that may be used to cause and/or result in a machine, circuit, or hardware component (e.g., a processor, potion of a processor, circuit, etc.) programmed with the instructions performing the operations. The operations may also optionally be performed by a combination of hardware and software. A processor, machine, circuit, or hardware may include specific or particular circuitry or other logic (e.g., hardware potentially combined with firmware and/or software) is operable to execute and/or process the instruction and store a result in response to the instruction.

Some embodiments include an article of manufacture (e.g., a computer program product) that includes a machine-readable medium. The medium may include a mechanism that provides, for example stores, information in a form that is readable by the machine. The machine-readable medium may provide, or have stored thereon, an instruction or sequence of instructions, that if and/or when executed by a machine are operable to cause the machine to perform and/or result in the machine performing one or operations, methods, or techniques disclosed herein. The machine-readable medium may provide, for example store, one or more of the embodiments of the instructions disclosed herein.

In some embodiments, the machine-readable medium may include a tangible and/or non-transitory machine-readable storage medium. For example, the tangible and/or non-transitory machine-readable storage medium may include a floppy diskette, an optical storage medium, an optical disk, an optical data storage device, a CD-ROM, a magnetic disk, a magneto-optical disk, a read only memory (ROM), a programmable ROM (PROM), an erasable-and-programmable ROM (EPROM), an electrically-erasable-and-programmable ROM (EEPROM), a random access memory (RAM), a static-RAM (SRAM), a dynamic-RAM (DRAM), a Flash memory, a phase-change memory, a phase-change data storage material, a non-volatile memory, a non-volatile data storage device, a non-transitory memory, a non-transitory data storage device, or the like.

Examples of suitable machines include, but are not limited to, a general-purpose processor, a special-purpose processor, an instruction processing apparatus, a digital logic circuit, an integrated circuit, or the like. Still other examples of suitable machines include a computing device or other electronic device that includes a processor, instruction processing apparatus, digital logic circuit, or integrated circuit. Examples of such computing devices and electronic devices include, but are not limited to, desktop computers, laptop computers, notebook computers, tablet computers, netbooks, smartphones, cellular phones, servers, network devices (e.g., routers and switches.), Mobile Internet devices (MIDs), media players, smart televisions, nettops, set-top boxes, and video game controllers.

Reference throughout this specification to "one embodiment," "an embodiment," "one or more embodiments," "some embodiments," for example, indicates that a particular feature may be included in the practice of the invention but is not necessarily required to be. Similarly, in the description various features are sometimes grouped together in a single embodiment, Figure, or description thereof for the purpose of streamlining the disclosure and aiding in the understanding of various inventive aspects. This method of disclosure, however, is not to be interpreted as reflecting an intention that the invention requires more features than are expressly recited in each claim. Rather, as the following claims reflect, inventive aspects lie in less than all features of a single disclosed embodiment. Thus, the claims following the Detailed Description are hereby expressly incorporated into this Detailed Description, with each claim standing on its own as a separate embodiment of the invention.

Example Embodiments

The following examples pertain to further embodiments. Specifics in the examples may be used anywhere in one or more embodiments.

Example 1 is a processor or other apparatus that includes a decode unit to receive an instruction that is to indicate a first source packed data operand and to indicate a second source packed data operand. The first and second source operands each to include a plurality of data elements. The data elements to include information selected from messages and logical combinations of messages that is sufficient to evaluate:

$$P1(W_{j-16} \text{ XOR } W_{j-9} \text{ XOR}(W_{j-3}<<<15))\text{XOR}(W_{j-13}<<<7)\text{XOR } W_{j-6},$$

P1 is a permutation function P1(X)=X XOR (X<<<15) XOR (X<<<23). The $W_{j-16}$, $W_{j-9}$, $W_{j-3}$, $W_{j-13}$, and $W_{j-6}$ are messages associated with a compression function of an SM3 hash function. The XOR is an exclusive OR operation. The <<< is a rotate operation. An execution unit is coupled with the decode unit. The execution unit is operable, in response to the instruction, to store a result packed data in a destination storage location indicated by the instruction. The result packed data to include a $W_j$ message to be input to a round j of the compression function of the SM3 hash function.

Example 2 includes the processor of any preceding example and optionally in which the decode unit is to decode the instruction in which the data elements of the first and second source packed data operands are to include a first subset of the messages $W_{j-16}$, $W_{j-9}$, $W_{j-3}$, $W_{j-13}$, and $W_{j-6}$ and are to include a logical combination of a second different subset of the messages $W_{j-16}$, $W_{j-9}$, $W_{j-3}$, $W_{j-13}$, and $W_{j-6}$.

Example 3 includes the processor of any preceding example and optionally in which the data elements of the first and second source packed data operands are to include the messages $W_{j-16}$, $W_{j-9}$, $W_{j-3}$, and the logical combination $W^*_{j-6}$ which is to be equal to $(W_{j-13}<<<7)$ XOR $W_{j-6}$.

Example 4 includes the processor of any preceding example and optionally in which the decode unit is to decode the instruction that is to implicitly indicate that a storage location to be used for one of the first and second source packed data operands is also to be used as the destination storage location. Also, in which the execution unit is to store the $W_j$ message over the logical combination of the second subset of the messages.

Example 5 includes the processor of any preceding example and optionally in which the decode unit is to decode the instruction in which the data elements of the first and second source packed data operands are to include messages and logical combinations of messages sufficient to evaluate:

$$P1(W_{j-15} \text{ XOR } W_{j-8} \text{ XOR}(W_{j-2}<<<15))\text{XOR}(W_{j-12}<<<7)\text{XOR } W_{j-5},$$

$W_{j-15}$, $W_{j-8}$, $W_{j-2}$, $W_{j-12}$, and $W_{j-5}$ are messages associated with the compression function. Also, in which the execution unit is to store a $W_{j+1}$ message in the result packed data. The $W_{j+1}$ message is to be input to a round j+1 of the compression function.

Example 6 includes the processor of Example 5 and optionally in which the data elements of the first and second source packed data operands are to include a first subset of the messages $W_{j-16}$, $W_{j-9}$, $W_{j-3}$, $W_{j-13}$, and $W_{j-6}$ and a first combination of a second different subset of the messages $W_{j-16}$, $W_{j-9}$, $W_{j-3}$, $W_{j-13}$, and $W_{j-6}$. Also in which the data elements of the first and second source packed data operands are to include a first subset of the messages $W_{j-15}$, $W_{j-8}$, $W_{j-2}$, $W_{j-12}$, and $W_{j-5}$ and a second combination of a second different subset of the messages $W_{j-15}$, $W_{j-8}$, $W_{j-2}$, $W_{j-12}$, and $W_{j-5}$.

Example 7 includes the processor of Example 6 and optionally in which the data elements of the first and second source packed data operands are to include the messages $W_{j-16}$, $W_{j-9}$, $W_{j-3}$, $W_{j-15}$, $W_{j-8}$, $W_{j-2}$, and the first and second combinations $W^*_{j-6}$, and $W^*_{j-5}$, in which $W^*_{j-6}$ is to be equal to $(W_{j-13}<<<7)$ XOR $W_{j-6}$, and in which $W^*_{j-5}$ is to be equal to $(W_{j-12}<<<7)$ XOR $W_{j-5}$.

Example 8 includes the processor of any of Examples 5 and 6 and optionally in which the decode unit is to decode the instruction that is to implicitly indicate that a storage location to be used for one of the first and second source packed data operands is also to be used as the destination storage location. Also, in which the execution unit is to store the $W_j$ and $W_{j+1}$ messages over the first and second combinations.

Example 9 includes the processor of any of Examples 5 to 8 and optionally in which the data elements of the first and second source packed data operands are to include at least three pairs of messages from adjacent rounds selected from a pair $W_{j-2}$ and $W_{j-3}$, a pair $W_{j-5}$ and $W_{j-6}$, a pair $W_{j-8}$ and $W_{j-9}$, a pair $W_{j-12}$ and $W_{j-13}$, and a pair $W_{j-15}$ and $W_{j-16}$. Also, in which each of the at least three pairs of messages is to have its corresponding messages in a same source packed data operand.

Example 10 includes the processor of any of Examples 5 to 9 and optionally in which the decode unit is to decode the instruction that is to indicate only the first and second source packed data operands as source operands. Also, in which the first and second source packed data operands are each to comprise a 128-bit packed data operand that are each to have four 32-bit data elements. Further, in which the data elements of the first and second source packed data operands are to include six messages $W_{j-16}$, $W_{j-9}$, $W_{j-3}$, $W_{j-15}$, $W_{j-8}$, $W_{j-2}$, a first combination $W^*_{j-6}$ and a second combination $W^*_{j-5}$, in which $W^*_{j-6}$ is to be equal to $(W_{j-13}<<<7)$ XOR $W_{j-6}$, and in which $W^*_{j-5}$ is to be equal to $(W_{j-12}<<<7)$ XOR $W_{j-5}$.

Example 11 includes the processor of any preceding example and optionally in which the decode unit is to decode the instruction in which the data elements of the first and second source packed data operands are to include messages and logical combinations of messages sufficient to evaluate:

$$P1(W_{j-14} \text{ XOR } W_{j-7} \text{ XOR}(W_{j-1}<<<15))\text{XOR}(W_{j-11}<<<7)\text{XOR } W_{j-4},$$

$W_{j-14}$, $W_{j-7}$, $W_{j-1}$, $W_{j-11}$, and $W_{j-4}$ are messages associated with the compression function. The execution unit is to store a $W_{j+2}$ message in the result packed data. The $W_{j+2}$ message to be input to a round j+2 of the compression function.

Example 12 is a method in a processor that includes receiving an instruction. The instruction indicating a first source packed data operand and indicating a second source packed data operand. The first and second source packed data operands each including a plurality of data elements. The data elements of the first and second source packed data operands to include information selected from messages and logical combinations of messages that is sufficient to evaluate:

$$P1(W_{j-16} \text{ XOR } W_{j-9} \text{ XOR}(W_{j-3}<<<15))\text{XOR}(W_{j-13}<<<7)\text{XOR } W_{j-6},$$

P1 is a permutation function P1(X)=X XOR (X<<<15) XOR (X<<<23). $W_{j-16}$, $W_{j-9}$, $W_{j-3}$, $W_{j-13}$, and $W_{j-6}$ are messages associated with a compression function of an SM3 hash function. XOR is an exclusive OR operation. <<< is a rotate operation. The method also includes storing a result packed data in a destination storage location that is indicated by the instruction. The result packed data includes a $W_j$ message to be input to a round j of the compression function of the SM3 hash function.

Example 13 includes the method of any preceding example and optionally in which receiving comprises receiving the instruction in which the data elements of the first and second source packed data operands are to include a first subset of the messages $W_{j-16}$, $W_{j-9}$, $W_{j-3}$, $W_{j-13}$, and $W_{j-6}$ and are to include a logical combination of a second different subset of the messages $W_{j-16}$, $W_{j-9}$, $W_{j-3}$, $W_{j-13}$, and $W_{j-6}$.

Example 14 includes the method of any preceding example and optionally in which the data elements of the first and second source packed data operands are to include the messages $W_{j-16}$, $W_{j-9}$, $W_{j-3}$, and the logical combination $W^*_{j-6}$ which is to be equal to $(W_{j-13}<<<7)$ XOR $W_{j-6}$.

Example 15 includes the method of any preceding example and optionally in which receiving comprises receiving the instruction that is to implicitly indicate that a storage location to be used for one of the first and second source packed data operands is also to be used as the destination storage location. Also, in which the execution unit is to store the $W_j$ message over the logical combination of the second subset of the messages.

Example 16 includes the method of any preceding example and optionally in which receiving comprises receiving the instruction in which the data elements of the first and second source packed data operands are to include messages and logical combinations of messages sufficient to evaluate:

$$P1(W_{j-15} \text{ XOR } W_{j-8} \text{ XOR}(W_{j-2}<<<15))\text{XOR}(W_{j-12}<<<7)\text{XOR } W_{j-5},$$

$W_{j-15}$, $W_{j-8}$, $W_{j-2}$, $W_{j-12}$, and $W_{j-5}$ are messages associated with the compression function. The execution unit is to store a $W_{j+1}$ message in the result packed data. The $W_{j+1}$ message to be input to a round j+1 of the compression function.

Example 17 includes the method of any preceding example and optionally in which receiving comprises receiving the instruction in which the data elements of the first and second source packed data operands are to include a first subset of the messages $W_{j-16}$, $W_{j-9}$, $W_{j-3}$, $W_{j-13}$, and $W_{j-6}$ and a first combination of a second different subset of the messages $W_{j-16}$, $W_{j-9}$, $W_{j-3}$, $W_{j-13}$, and $W_{j-6}$. Also, in which the data elements of the first and second source packed data operands are to include a first subset of the messages $W_{j-15}$, $W_{j-8}$, $W_{j-2}$, $W_{j-12}$, and $W_{j-5}$ and a second combination of a second different subset of the messages $W_{j-15}$, $W_{j-8}$, $W_{j-2}$, $W_{j-12}$, and $W_{j-5}$.

Example 18 is a processor or other apparatus that includes a decode unit to receive an instruction. The instruction is to indicate a first source packed data operand and to indicate a second source packed data operand. The first and second source packed data operands each to include a plurality of data elements. The data elements of the first and second source packed data operands to include messages $W_{j-16}$, $W_{j-15}$, $W_{j-9}$, $W_{j-8}$, $W_{j-3}$, and $W_{j-2}$ associated with a compression function of an SM3 hash function. The data elements of the first and second source packed data operands to also include a first combination $W^*_{j-6}$ which is to be equal to $(W_{j-13}<<<7)$ XOR $W_{j-6}$, and a second combination $W^*_{j-5}$ which is to be equal to $(W_{j-12}<<<7)$ XOR $W_{j-5}$. $W_{j-13}$, $W_{j-12}$, $W_{j-6}$, and $W_{j-5}$ are also messages associated with the compression function. An execution unit of the processor is coupled with the decode unit. The execution unit is operable, in response to the instruction, to store a result packed data in a destination storage location to be indicated by the instruction. The result packed data is to include a $W_j$ message to be input to a round j of the compression function, and a $W_{j+1}$ message to be input to a round j+1 of the compression function.

Example 19 includes the processor of Example 18 and optionally in which the execution unit is to store the $W_j$ and $W_{j+1}$ messages over the first and second logical combinations $W^*_{j-6}$ and $W+_{j-5}$.

Example 20 includes the processor of either Example 18 or Example 19 and optionally in which the messages $W_{j-16}$ and $W_{j-15}$ are in a same source packed data operand, in which the messages $W_{j-9}$ and $W_{j-8}$ are in a same source packed data operand, and in which the messages $W_{j-3}$ and $W_{j-2}$ are in a same source packed data operand.

Example 21 is a system to process instructions that includes an interconnect and a processor coupled with the interconnect. The processor is to receive an instruction that is to indicate a first source packed data operand and to indicate a second source packed data operand. The first and second source packed data operands each to include a plurality of data elements. The data elements of the first and second source packed data operands to include information selected from messages and logical combinations of messages that is sufficient to evaluate:

$$P1(W_{j-16} \text{ XOR } W_{j-9} \text{ XOR}(W_{j-3}<<<15))\text{XOR}(W_{j-13}<<<7)\text{XOR } W_{j-6},$$

P1 is a permutation function $P1(X)=X$ XOR $(X<<<15)$ XOR $(X<<<23)$. $W_{j-16}$, $W_{j-9}$, $W_{j-3}$, $W_{j-13}$, and $W_{j-6}$ are messages associated with a compression function of an SM3 hash function. XOR is an exclusive OR operation. <<< is a rotate operation. The processor is operable, in response to the instruction, to store a result packed data in a destination storage location indicated by the instruction. The result packed data is to include a $W_j$ message to be input to a round j of the compression function of the SM3 hash function. The system also includes a dynamic random access memory (DRAM) coupled with the interconnect.

Example 22 includes the system of Example 21 and optionally in which the Wj message is to be stored over a logical combination of two messages.

Example 23 is an article of manufacture that includes a non-transitory machine-readable storage medium. The non-transitory machine-readable storage medium stores an instruction. The instruction is to indicate a first source packed data operand and to indicate a second source packed data operand. The first and second source packed data operands are each to include a plurality of data elements. The data elements of the first and second source packed data operands are to include a plurality of messages associated with a compression function of an SM3 hash function and to include information sufficient to evaluate:

$$P1(W_{j-16} \text{ XOR } W_{j-9} \text{ XOR}(W_{j-3}<<<15))\text{XOR}(W_{j-13}<<<7)\text{XOR } W_{j-6},$$

P1 is a permutation function $P1(X)=X$ XOR $(X<<<15)$ XOR $(X<<<23)$. $W_{j-16}$, $W_{j-9}$, $W_{j-3}$, $W_{j-13}$, and $W_{j-6}$ are messages associated with the compression function of the SM3 hash function. XOR is an exclusive OR operation. <<< is a rotate operation. The instruction, if executed by a machine, is operable to cause the machine to perform operations comprising storing a result packed data in the destination storage location. The result packed data is to include a $W_j$ message to be input to a round j of the compression function of the SM3 hash function.

Example 24 includes the article of Example 23 and optionally in which the result packed data is also to include a $W_{j+1}$ message.

Example 25 includes a processor or other apparatus that is operable to perform the method of any of Examples 12-17.

Example 26 includes a processor or other apparatus that includes means for performing the method of any of Examples 12-17.

Example 27 includes a processor that includes modules, units, logic, circuitry, means, or any combination thereof, to perform the method of any of Examples 12-17.

Example 28 includes a computer system or other electronic device including an interconnect, a processor coupled with the interconnect, and at least one component coupled with the interconnect that is selected from a DRAM, a graphics chip, a wireless communications chip, a phase change memory, and a video camera, the computer system or other electronic device to perform the method of any of Examples 12-17.

Example 29 includes an optionally non-transitory machine-readable medium that optionally stores or otherwise provides an instruction that if and/or when executed by a processor, computer system, or other machine is operable to cause the machine to perform the method of any of Examples 12-17.

Example 30 includes a processor or other apparatus that is operable to perform one or more operations or any method substantially as described herein.

Example 31 includes a processor or other apparatus including means for performing one or more operations or any method substantially as described herein.

Example 32 includes a processor or other apparatus that is operable to perform any of the instructions substantially as described herein.

Example 33 includes a processor or other apparatus including means for performing any of the instructions substantially as described herein.

Example 34 includes a method that includes converting a first instruction, which may be any of the instructions substantially as disclosed herein, and which is of a first instruction set, into one or more instructions of a second instruction set. The method also includes decoding and executing the one or more instructions of the second instruction set on a processor. The executing includes storing a result in a destination. The result may include any of the results substantially as disclosed herein for the first instruction.

Example 35 includes a processor or other apparatus including a decode unit that is operable to decode instructions of a first instruction set. The decode unit is to receive one or more instructions that emulate a first instruction, which may be any of the instructions substantially as disclosed herein, and which is to be of a second instruction set. The processor or other apparatus also includes one or more execution units coupled with the decode unit to execute the one or more instructions of the first instruction set. The one or more execution units in response to the one or more instructions of the first instruction set are operable to store a result in a destination. The result may include any of the results substantially as disclosed herein for the first instruction.

Example 36 includes a computer system or other electronic device that includes a processor having a decode unit that is operable to decode instructions of a first instruction set, and having one or more execution units. The computer system also includes a storage device coupled to the processor. The storage device is to store a first instruction, which may be any of the instructions substantially as disclosed herein, and which is to be of a second instruction set. The storage device is also to store instructions to convert the first instruction into one or more instructions of the first instruction set. The one or more instructions of the first instruction set, when executed by the processor, are operable to cause the processor to store a result in a destination. The result may include any of the results substantially as disclosed herein for the first instruction.

What is claimed is:

1. A processor comprising:
   a plurality of packed data registers;
   a decode unit to decode an instruction that is to indicate a first source packed data operand and to indicate a second source packed data operand, wherein the instruction has a field to explicitly specify a first packed data register of the plurality of packed data registers which is to store one of the first and second source packed data operands, the first and second source packed data operands each to include a plurality of data elements, the data elements of the first and second source packed data operands to include information selected from messages and logical combinations of messages associated with an SM3 hash function that is sufficient to evaluate:

$P1(W_{j-16}$ XOR $W_{j-9}$ XOR $(W_{j-3}<<<15))$ XOR $(W_{j-13}<<<7)$ XOR $W_{j-6}$, in which P1 is a permutation function $P1(X)=X$ XOR $(X<<<15)$ XOR $(X<<<23)$, $W_{j-16}$, $W_{j-9}$, $W_{j-3}$, $W_{j-13}$, and $W_{j-6}$ are messages associated with a compression function of the SM3 hash function, XOR is an exclusive OR operation, and $<<<$ is a rotate operation, wherein said one of the first and second source packed data operands is to include a first data element at a first position in the first packed data register, the first data element to be equal to a logical combination of a subset of the messages $W_{j-16}$, $W_{j-9}$, $W_{j-3}$, $W_{j-13}$, and $W_{j-6}$; and
   an execution unit coupled with the decode unit, the execution unit operable, in response to the decode of the instruction, to store a result packed data in the first packed data register, the result packed data to include a $W_j$ message to be input to a round j of the compression function of the SM3 hash function,
   wherein the instruction implicitly indicates that the first packed data register is also to be used to store the result packed data, and
   wherein the $W_j$ message is to be stored at the first position in the first packed data register overwriting the logical combination of the subset of the messages $W_{j-16}$, $W_{j-9}$, $W_{j-3}$, $W_{j-13}$, and $W_{j-6}$.

2. The processor of claim 1, in which the decode unit is to decode the instruction in which the data elements of the first and second source packed data operands are to include a first subset of the messages $W_{j-16}$, $W_{j-9}$, $W_{j-3}$, $W_{j-13}$, and $W_{j-6}$ and are to include the logical combination which is to be of a second different subset of the messages $W_{j-16}$, $W_{j-9}$, $W_{j-3}$, $W_{j-13}$, and $W_{j-6}$, and wherein the result packed data is to include no more than three new messages for three new rounds.

3. The processor of claim 2, in which the data elements of the first and second source packed data operands are to include the messages $W_{j-16}$, $W_{j-9}$, $W_{j-3}$, and the logical combination $W^*_{j-6}$ which is to be equal to $(W_{j-13}<<<7)$ XOR $W_{j-6}$.

4. The processor of claim 1, in which the decode unit is to decode the instruction in which the data elements of the first and second source packed data operands are to include information selected from messages and logical combinations of messages sufficient to evaluate:
   $P1(W_{j-15}$ XOR $W_{j-8}$ XOR $(W_{j-2}<<<15))$ XOR $(W_{j-12}<<<7)$ XOR $W_{j-5}$, in which $W_{j-15}$, $W_{j-8}$, $W_{j-2}$, $W_{j-12}$, and $W_{j-5}$ are messages associated with the compression function, and in which the execution unit is to store a $W_{j+1}$ message in the result packed data, the $W_{j+1}$ message to be input to a round j+1 of the compression function, and wherein the execution unit is to calculate the messages $W_j$ and $W_{j+1}$ in parallel.

5. The processor of claim 4, in which the data elements of the first and second source packed data operands are to include a first subset of the messages $W_{j-16}$, $W_{j-9}$, $W_{j-3}$, $W_{j-13}$, and $W_{j-6}$ and the logical combination which is to be of a second different subset of the messages $W_{j-16}$, $W_{j-9}$, $W_{j-3}$, $W_{j-13}$, and $W_{-6}$, and in which the data elements of the first and second source packed data operands are to include a first subset of the messages $W_{j-15}$, $W_{j-8}$, $W_{j-2}$, $W_{j-12}$, and $W_{j-5}$ and a second combination of a second different subset of the messages $W_{j-15}$, $W_{j-8}$, $W_{j-2}$, $W_{j-12}$, and $W_{j-5}$.

6. The processor of claim 5, in which the data elements of the first and second source packed data operands are to include the messages $W_{j-16}$, $W_{j-9}$, $W_{j-3}$, $W_{j-15}$, $W_{j-8}$, $W_{j-2}$, and the logical combination $W^*_{j-6}$, and the second combination $W^*_{j-5}$, in which $W^*_{j-6}$ is to be equal to $(W_{j-13}{<<<}7)$ XOR $W_{j-6}$, and in which $W^*_{j-5}$ is to be equal to $(W_{j-12}{<<<}7)$ XOR $W_{j-5}$.

7. The processor of claim 5, in which the execution unit is to store the $W_j$ and $W_{j+1}$ messages over the logical combination and the second combination.

8. The processor of claim 4, in which the data elements of the first and second source packed data operands are to include at least three pairs of messages from adjacent rounds selected from a pair $W_{j-2}$ and $W_{j-3}$, a pair $W_{j-5}$ and $W_{j-6}$, a pair $W_{j-8}$ and $W_{j-9}$, a pair $W_{j-12}$ and $W_{j-13}$, and a pair $W_{j-15}$ and $W_{j-16}$, and in which each of the at least three pairs of messages is to have its corresponding messages in a same source packed data operand.

9. The processor of claim 4, in which the decode unit is to decode the instruction that is to indicate only the first and second source packed data operands as source operands, in which the first and second source packed data operands are each to be a 128-bit packed data operand and are each to have four 32-bit data elements, and in which the data elements of the first and second source packed data operands are to include six messages $W_{j-16}$, $W_{j-9}$, $W_{j-3}$, $W_{j-15}$, $W_{j-8}$, $W_{j-2}$, a first combination $W^*_{j-6}$ as the logical combination and a second combination $W^*_{j-5}$, in which $W^*_{j-6}$ is to be equal to $(W_{j-13}{<<<}7)$ XOR $W_{j-6}$, and in which $W^*_{j-5}$ is to be equal to $(W_{j-12}{<<<}7)$ XOR $W_{j-5}$.

10. The processor of claim 1, in which the decode unit is to decode the instruction in which the data elements of the first and second source packed data operands are to include messages and logical combinations of messages sufficient to evaluate:

$P1(W_{j-14}$ XOR $W_{j-7}$ XOR $(W_{j-1}{<<<}15))$ XOR $(W_{j-11}{<<<}7)$ XOR $W_{j-4}$, in which $W_{j-14}$, $W_{j-7}$, $W_{j-1}$, $W_{j-11}$, and $W_{j-4}$ are messages associated with the compression function, and in which the execution unit is to store a $W_{j+2}$ message in the result packed data, the $W_{j+2}$ message to be input to a round j+2 of the compression function, and wherein the execution unit is to calculate the messages $W_j$, $W_{j+1}$, and $W_{j+2}$ in parallel.

11. The processor of claim 1, wherein the result packed data is to include the message $W_{j-16}$.

12. The processor of claim 1, wherein the result packed data is to include three new messages for three new rounds, but no more than the three new messages for the three new rounds.

13. A method in a processor, the method comprising:
receiving an instruction, the instruction indicating a first source packed data operand and indicating a second source packed data operand, wherein a field of the instruction explicitly specifies an architectural packed data register of the processor which stores one of the first and second source packed data operands, the first and second source packed data operands each including a plurality of data elements, the data elements of the first and second source packed data operands including information selected from messages and logical combinations of messages that is sufficient to evaluate:

$P1(W_{j-16}$ XOR $W_{j-9}$ XOR $(W_{j-3}{<<<}15))$ XOR $(W_{j-13}{<<<}7)$ XOR $W_{j-6}$, in which P1 is a permutation function:

$P1(X)=X$ XOR $(X{<<<}15)$ XOR $(X{<<<}23)$, in which $W_{j-16}$, $W_{j-9}$, $W_{j-3}$, $W_{j-13}$, and $W_{j-6}$ are messages associated with a compression function of an SM3 hash function, in which XOR is an exclusive OR operation, and in which $<<<$ is a rotate operation, wherein said one of the first and second source packed data operands includes a first data element at a first position in the architectural packed data register, the first data element equal to a logical combination of a subset of the messages $W_{j-16}$, $W_{j-9}$, $W_{j-3}$, $W_{-13}$, and $W_{j-6}$; and
storing a result packed data in the architectural packed data register the result packed data including a $W_j$ message to be input to a round j of the compression function of the SM3 hash function,
wherein the instruction implicitly indicates that the architectural packed data register is also used to store the result packed data,
wherein the $W_j$ message is stored at the first position in the architectural packed data register overwriting the logical combination of the subset of the messages $W_{j-16}$, $W_{j-9}$, $W_{j-3}$, $W_{j-13}$, and $W_{j-6}$, and
wherein the result packed data also stores the message $W_{j-6}$.

14. The method of claim 13, in which receiving comprises receiving the instruction in which the data elements of the first and second source packed data operands include a first subset of the messages $W_{j-16}$, $W_{j-9}$, $W_{j-3}$, $W_{j-13}$, and $W_{j-6}$ and include the logical combination which is of a second different subset of the messages $W_{j-16}$, $W_{j-9}$, $W_{j-3}$, $W_{j-13}$, and $W_{j-6}$.

15. The method of claim 14, in which the data elements of the first and second source packed data operands include the messages $W_{j-16}$, $W_{j-9}$, $W_{j-3}$, and the logical combination $W^*_{j-6}$ which is equal to $(W_{j-13}{<<<}7)$ XOR $W_{j-6}$.

16. The method of claim 13, in which receiving comprises receiving the instruction in which the data elements of the first and second source packed data operands include messages and logical combinations of messages sufficient to evaluate:

$P1(W_{j-15}$ XOR $W_{j-8}$ XOR $(W_{j-2}{<<<}15))$ XOR $(W_{j-12}{<<<}7)$ XOR $W_{j-5}$, in which $W_{j-15}$, $W_{j-8}$, $W_{j-2}$, $W_{j-12}$, and $W_{j-5}$ are messages associated with the compression function, and in which the execution unit is to store a $W_{j+1}$ message in the result packed data, the $W_{j+1}$ message to be input to a round j+1 of the compression function, and wherein the messages $W_j$ and $W_{j+1}$ are to be calculated in parallel.

17. The method of claim 16, in which receiving comprises receiving the instruction in which the data elements of the first and second source packed data operands include a first subset of the messages $W_{j-16}$, $W_{j-9}$, $W_{j-3}$, $W_{j-13}$, and $W_{j-6}$ and the logical combination which is of a second different subset of the messages $W_{j-16}$, $W_{j-9}$, $W_{j-3}$, $W_{j-13}$, and $W_{j-6}$, and in which the data elements of the first and second source packed data operands include a first subset of the messages $W_{j-15}$, $W_{j-8}$, $W_{j-2}$, $W_{j-12}$, and $W_{j-5}$ and a second combination of a second different subset of the messages $W_{j-15}$, $W_{j-8}$, $W_{j-2}$, $W_{j-12}$, and $W_{j-5}$.

18. A processor comprising:
a plurality of packed data registers;
a decode unit to decode an instruction, the instruction to indicate a first source packed data operand and to indicate a second source packed data operand, wherein the instruction has a field to explicitly specify a first packed data register of the plurality of packed data registers which is to store one of the first and second source packed data operands, the first and second source packed data operands each to include a plurality of data elements, the data elements of the first and second source packed data operands to include messages $W_{j-16}$, $W_{j-15}$, $W_{j-9}$, $W_{j-8}$, $W_{j-3}$, and $W_{j-2}$ associated with a compression function of an SM3 hash function, the data elements of the first and second source packed data operands to also include a first data element equal to a first combination $W^*_{j-6}$ which is to be equal to $(W_{j-13}<<<7)$ XOR $W_{j-6}$, and a second data element equal to a second combination $W^*_{j-5}$ which is to be equal to $(W_{j-12}<<<7)$ XOR $W_{j-5}$, where $W_{j-13}$, $W_{j-12}$, $W_{j-6}$, and $W_{j-5}$ are also messages associated with the compression function, wherein said one of the first and second source packed data operands is to include at least one of the first and second data elements at a first position in the first packed data register; and
an execution unit coupled with the decode unit, the execution unit operable, in response to the instruction, to store a result packed data in the first packed data register, the result packed data to include a $W_j$ message to be input to a round j of the compression function, and a $W_{j+1}$ message to be input to a round j+1 of the compression function,
wherein the first packed data register is implicitly to be used to store the result packed data,
wherein the $W_j$ message is to be stored at the first position in the first packed data register overwriting said one of the first and second data elements.

19. The processor of claim 18, in which the execution unit is to store the $W_j$ and $W_{j+1}$ messages over the first and second logical combinations $W^*_{j-6}$ and $W^*_{j-5}$.

20. The processor of claim 18, in which the messages $W_{j-16}$ and $W_{j-15}$ are in a same source packed data operand, in which the messages $W_{j-9}$ and $W_{j-8}$ are in a same source packed data operand, and in which the messages $W_{j-3}$ and $W_{j-2}$ are in a same source packed data operand, and wherein the result packed data is to include the message $W_{j-16}$.

21. The processor of claim 18, wherein the result packed data is to include no more than three new messages for three new rounds.

22. A system to process instructions comprising:
an interconnect;
a processor coupled with the interconnect, the processor having a plurality of packed data registers, the processor to receive an instruction that is to indicate a first source packed data operand and to indicate a second source packed data operand, the instruction having a field to explicitly specify a first packed data register of the plurality of packed data registers which is to store one of the first and second source packed data operands, the first and second source packed data operands each to include a plurality of data elements, the data elements of the first and second source packed data operands to include information selected from messages and logical combinations of messages that is sufficient to evaluate:

$$P1(W_{j-16} \text{ XOR } W_{j-9} \text{ XOR } (W_{j-3}<<<15)) \text{ XOR } (W_{j-13}<<<7) \text{ XOR}$$

in which P1 is a permutation function:

$$P1(X)=X \text{ XOR } (X<<<15) \text{ XOR } (X<<<23),$$

in which $W_{j-16}$, $W_{j-9}$, $W_{j-3}$, $W_{j-13}$, and $W_{j-6}$ are messages associated with a compression function of an SM3 hash function, in which XOR is an exclusive OR operation, and in which <<< is a rotate operation, wherein said one of the first and second source packed data operands is to include a first data element at a first position in the first packed data register, the first data element to be equal to a logical combination of a subset of the messages $W_{j-16}$, $W_{j-9}$, $W_{j-3}$, $W_{j-13}$, and $W_{j-6}$, the processor operable, in response to the instruction, to store a result packed data in the first packed data register the result packed data to include a $W_j$ message to be input to a round j of the compression function of the SM3 hash function, wherein the instruction is to implicitly indicate that the first packed data register is also to be used to store the result packed data, and wherein the $W_j$ message is to be stored at the first position in the first packed data register overwriting the logical combination of the subset of the messages $W_{j-16}$, $W_{j-9}$, $W_{j-3}$, $W_{j-13}$, and $W_{j-6}$; and
a dynamic random access memory (DRAM) coupled with the interconnect.

23. The system of claim 22, in which the $W_j$ message is to be stored over a logical combination of two messages.

24. A processor comprising:
a plurality of packed data registers;
a decode unit to decode an instruction that is to indicate a first source packed data operand and to indicate a second source packed data operand, wherein the instruction has a field to explicitly specify a packed data register of the plurality of packed data registers which is to store one of the first and second source packed data operands, the first and second source packed data operands each to include a plurality of data elements, the data elements of the first and second source packed data operands to include information selected from messages and logical combinations of messages associated with an SM3 hash function that is sufficient to evaluate:

$$P1(W_{j-16} \text{ XOR } W_{j-9} \text{ XOR } (W_{j-3}<<<15)) \text{ XOR } (W_{j-13}<<<7) \text{ XOR } W_{j-6},$$

in which P1 is a permutation function $P1(X)=X$ XOR $(X<<<15)$ XOR $(X<<<23)$, $W_{j-16}$, $W_{j-9}$, $W_{j-3}$, $W_{j-13}$, and $W_{j-6}$ are messages associated with a compression function of the SM3 hash function, XOR is an exclusive OR operation, and <<< is a rotate operation; and
an execution unit coupled with the decode unit, the execution unit operable, in response to the decode of the instruction, to store a result packed data in a destination storage location that is to be indicated by the instruction, the result packed data to include three new messages for three new rounds but no more than the three new messages for the three new rounds, the three new messages to include a $W_j$ message to be input to a round j of the compression function of the SM3 hash function, and the result packed data to include the message $W_{j-16}$.

25. The processor of claim 24, wherein said one of the first and second source packed data operands is to include a first data element at a first position in the packed data register, the first data element to be equal to a logical combination of a subset of the messages $W_{j-16}$, $W_{j-9}$, $W_{j-3}$, $W_{j-13}$, and $W_{j-6}$, and wherein it is implicit to the instruction that the Wj message is to be stored over the logical combination in the packed data register.

* * * * *